United States Patent [19]
Nakamura

[11] Patent Number: 5,539,355
[45] Date of Patent: Jul. 23, 1996

[54] FREQUENCY-SHIFT-KEYING DETECTOR USING DIGITAL CIRCUITS

[75] Inventor: Seizo Nakamura, Tokyo, Japan

[73] Assignee: Oki Electric Industry Co., Ltd., Tokyo, Japan

[21] Appl. No.: 460,653

[22] Filed: Jun. 2, 1995

[30] Foreign Application Priority Data

Jun. 6, 1994 [JP] Japan ................................. 6-123980
Nov. 21, 1994 [JP] Japan ................................. 6-286458

[51] Int. Cl.$^6$ ................................................. H04L 27/14
[52] U.S. Cl. ...................... 329/302; 329/303; 375/272; 375/324; 375/334
[58] Field of Search ................................... 329/300, 301, 329/302, 303; 375/272, 324, 326, 334, 335

[56] References Cited

U.S. PATENT DOCUMENTS

| 4,752,742 | 6/1988 | Akaiwa . | |
| 5,243,299 | 9/1993 | Marchetto et al. | 329/300 |
| 5,436,589 | 7/1995 | LaRosa et al. | 329/302 |

FOREIGN PATENT DOCUMENTS

| 61-265922 | 11/1986 | Japan . |
| 1-45097 | 10/1989 | Japan . |
| 4-10776 | 2/1992 | Japan . |
| 5-1662 | 1/1993 | Japan . |
| 2158330 | 11/1985 | United Kingdom . |

OTHER PUBLICATIONS

Papers from the 1980 General Meeting of the Institute of Electronics and Communication Engineers of Japan, No. 2107, "Tachi FM Disukuri Kenpa Hoshiki no Tokusel", Akaiwa et al.

Papers from the 1980 General Meeting of the Institute of Electronics and Communication Engineers of Japan, No. 2108, "Tachi FM Disukuri Kenpa Hoshiki ni okeru Chushin Shuhasu to Henchodo Hendo no Hosho", Takase and Akaiwa.

Institute of Electronics and Communication Engineers of Japan, "Dijitaru Shingo Shori", 1st edition, Nov. 10, 1975, pp. 43–45.

Primary Examiner—Siegfried H. Grimm
Attorney, Agent, or Firm—Spencer & Frank

[57] ABSTRACT

A signal modulated by frequency-shift keying is input to a detector consisting of an instantaneous phase detection circuit that detects the instantaneous phase of the input signal, a differentiating circuit that differentiates the instantaneous phase to obtain the instantaneous frequency, and a baseband processing circuit that recovers clock and data signals from the instantaneous frequency. To detect the instantaneous phase, the instantaneous phase detection circuit compares the logic levels of the input signal and a clock signal, and filters the resulting bit stream with a digital low-pass filter. The detector consists entirely of digital circuits that are well suited for large-scale integration.

55 Claims, 23 Drawing Sheets

FREQUENCY-SHIFT-KEYING DETECTOR USING DIGITAL CIRCUITS

BACKGROUND OF THE INVENTION

The present invention relates to a frequency-shift-keying (FSK) detector suitable for incorporation into a large-scale integrated circuit.

FSK is a modulation system that encodes digital data as shifts in a carrier frequency. Binary FSK employs frequency shifts of $-\Delta f$ and $+\Delta f$ to represent single bit values (0 or 1); quaternary FSK employs frequency shifts of $-3\Delta f$, $-\Delta f$, $+\Delta f$, and $+3\Delta f$ to represent dibit values (00, 01, 10, or 11); and in general M-ary FSK employs frequency shifts from $-(M-1)\Delta f$ to $+(M-1)\Delta f$ to represent L-bit values, where L and M are positive integers such that $M=2^L$.

A conventional M-ary FSK detector employs a discriminator, which is basically a bank of M bandpass filters tuned to frequencies from $-(M-1)\Delta f$ to $+(M-1)\Delta f$ at intervals of $2\Delta f$, to demodulate the FSK signal and recover the data. The discriminator, however, is an analog circuit comprising resistors, capacitors, and inductors, so its performance depends strongly on resistance, capacitance, and inductance values, which are notoriously prone to variation due to non-uniform fabrication conditions. Its analog circuit elements are moreover difficult to implement in a large-scale integrated circuit.

SUMMARY OF THE INVENTION

It is accordingly an object of the present invention to provide a robust FSK detector that is unaffected by variability of analog circuit parameters.

Another object of the invention is to provide an FSK detector suitable for large-scale integration.

Yet another object is to provide an FSK detector that can correct frequency offset.

Still another object is to provide an FSK detector that can operate at high frequencies.

In the invented FSK detector, an instantaneous phase detection circuit receives an FSK signal and outputs an instantaneous phase signal representing the instantaneous phase of the FSK signal. A differentiating circuit differentiates the instantaneous phase signal, thereby generating an instantaneous frequency signal. A baseband processing circuit recovers data from the instantaneous frequency signal.

The instantaneous phase detection circuit, differentiating circuit, and baseband processing circuit are digital circuits. In the instantaneous phase detection circuit, a logic circuit performs a logic operation on the FSK signal and a clock signal, thereby generating a stream of bits, which is filtered by a low-pass filter. To generate the instantaneous frequency signal, another logic circuit modifies the output of the low-pass filter according to whether the FSK signal leads or lags the clock signal.

DETAILED DESCRIPTION OF THE INVENTION

Several embodiments of the invention will be described with reference to the attached illustrative drawings. First, however, a general description will be given of a principle upon which the invention operates.

The instantaneous frequency f of, for example, a binary FSK signal can be described in terms of a center frequency $f_0$ and deviation $\pm\Delta f$. The frequency f is generally expressed in Hertz units (cycles per second), but if multiplied by $2\pi$ it becomes an angular frequency $\omega$ expressed in radians per second. These relations are summarized in the following equations.

$$f = f_0 \pm \Delta f$$

$$2\pi f = 2\pi_0 \pm 2\pi\Delta f$$

$$\omega = \omega_0 \pm \Delta\omega$$

Integrating the instantaneous angular frequency $\omega$ with respect to time t (expressed in seconds) produces an instantaneous angular phase $\theta$, expressed in radians. This instantaneous phase $\theta$ is accordingly given as follows:

$$\theta = \int \omega \, dt = \int (\omega_0 \pm \Delta \omega) dt$$
$$= \omega_0 t + \int \pm \Delta \omega \, dt$$
$$= 2\pi (f_0 t + \int \pm \Delta f \, dt)$$

Conversely, if the instantaneous phase θ is differentiated with respect to time (and scaled by dividing by 2π), the result is the instantaneous frequency f, which is the sum of the center frequency $f_0$ and frequency shift ±Δf. The center frequency $f_0$ is fixed, so it can be subtracted to obtain the frequency shift ±Δf, the plus or minus sign of which gives the value of the transmitted data bit (one or zero).

Similarly, with quaternary FSK modulation, differentiating the instantaneous phase θ and subtracting the center frequency $f_0$ gives one of four frequency shifts (±3 Δf or ±Δf), representing a combination of two bits. With M-ary FSK modulation, differentiating θ and subtracting $f_0$ gives one of M frequency shifts representing an L-bit value.

The present invention operates by first detecting the instantaneous phase θ, then differentiating to get the instantaneous frequency f, and recovering the transmitted data from f. These operations can be carried out by digital circuits which are well suited for large-scale integration.

First embodiment

Figure 1:
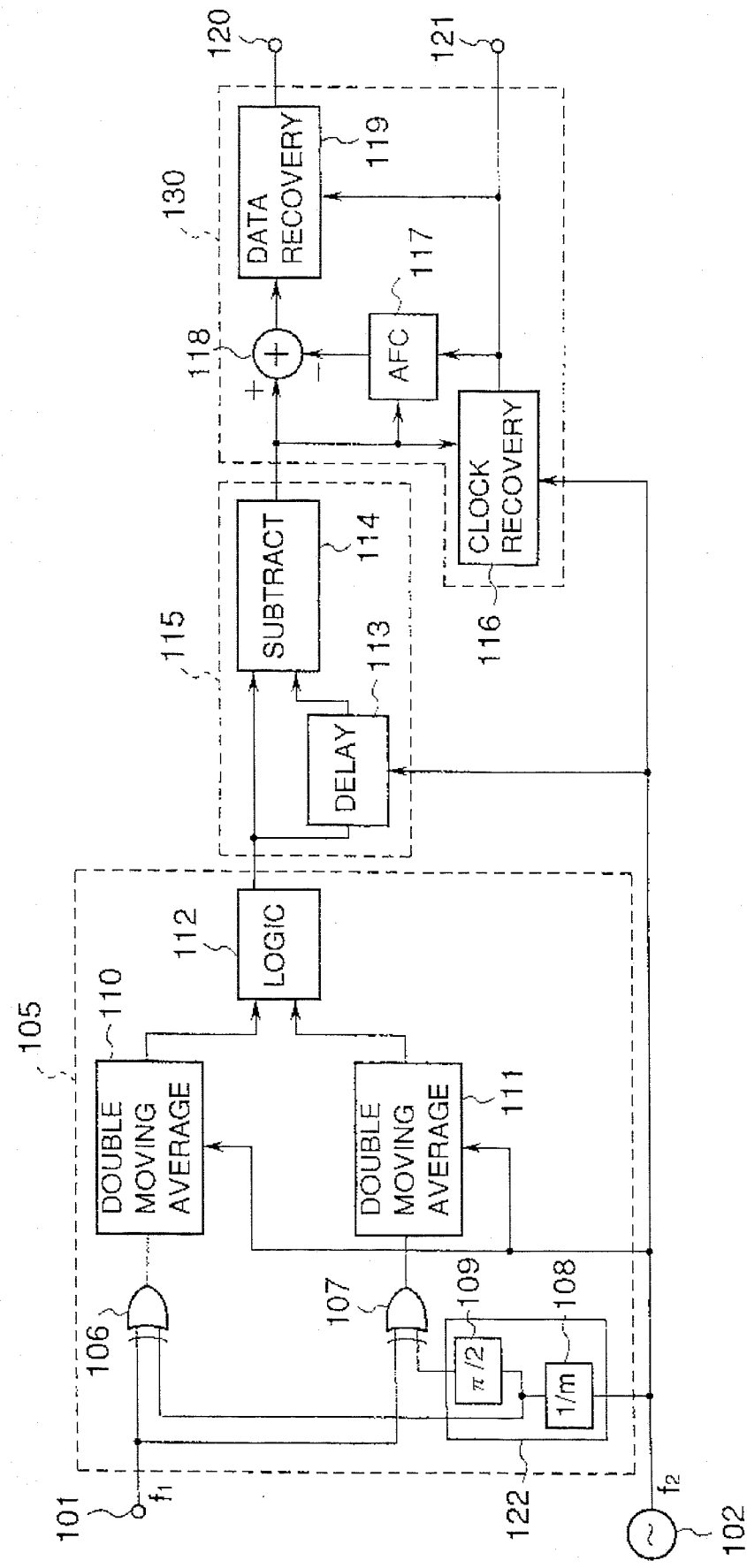
FIG. 1 is a block diagram of a first embodiment of the invention.

FIG. 1 shows the general structure of a novel FSK detector for demodulating an FSK signal received at an input terminal 101. The detector comprises an instantaneous phase detection circuit 105 which receives the FSK signal and outputs an instantaneous phase signal, a differentiating circuit 115 which receives the instantaneous phase signal and outputs an instantaneous frequency signal, and a baseband processing circuit 130 which receives the instantaneous frequency signal and recovers a baseband clock and data.

The FSK signal has a certain center frequency and a certain baseband data rate, this latter determining the interval between frequency shifts in the FSK signal. The FSK detector is a digital circuit and is driven by a master clock signal output from an oscillator 102. In the drawing, $f_1$ denotes the center frequency of the FSK signal, and $f_2$ the frequency of the master clock signal.

Frequency $f_1$ is of course higher than the baseband data rate. Frequency $f_2$ is an exact integer multiple of the baseband data rate, and is at least an approximate integer multiple of $f_1$. That is, $f_2$ is approximately equal to $f_1 \times m$, where m is an integer greater than one.

The instantaneous phase detection circuit 105 comprises two exclusive-OR gates 106 and 107, a 1/m frequency divider 108, a π/2 phase shifter 109, two double-moving-average filters 110 and 111, and a polarity-control logic circuit 112.

The 1/m frequency divider 108 and π/2 phase shifter 109 constitute an orthogonal clock generator 122 that generates two mutually orthogonal clock signals. The 1/m frequency divider 108 divides the frequency $f_2$ of the master clock signal from the oscillator 102 by m to obtain the first clock signal. The π/2 phase shifter 109 then delays the first clock signal by a phase angle of π/2 to generate the second clock signal. The first and second clock signals accordingly have an identical frequency of $f_2/m$, but differ in phase by π/2. Their common frequency $f_2/m$ is also approximately equal to $f_1$.

Exclusive-OR gate 106 receives the FSK signal and first clock signal and takes their exclusive logical OR to obtain a first bit stream, which it provides to double-moving-average filter 110. Exclusive-OR gate 107 takes the exclusive logical OR of the FSK signal and the second clock signal to obtain a second bit stream, which it provides to double-moving-average filter 111. The two bit streams are generated continuously by the exclusive-OR gates 106 and 107, and are sampled by the double-moving-average filters 110 and 111 at intervals equal to the period of the master clock ($1/f_2$).

Double-moving-average filter 110 takes a moving average of the bit stream from exclusive-OR gate 106 to obtain a first moving-average signal. Double-moving-average filter 111 takes a moving average of the bit stream from exclusive-OR gate 107 to obtain a second moving-average signal. More precisely, each double-moving-average filter takes a moving average of its input bit stream, then takes a further moving average of this moving average.

It is possible to use single-moving-average filters, which do not iterate the moving-average process in this way, but double-moving-average filters are preferable, for a reason to be described later.

The polarity-control logic circuit 112 modifies the sign of the first moving-average signal according to the magnitude of the second moving-average signal to generate the instantaneous phase signal.

The differentiating circuit 115 comprises a delay line 113 and a subtractor 114. The delay line 113 delays the instantaneous phase signal by one or more periods of the master clock signal, which it receives from the oscillator 102. The subtractor 114 takes the difference between the instantaneous phase signal and the delayed instantaneous phase signal, thereby differentiating the instantaneous phase signal to obtain the instantaneous frequency signal, which is supplied to the baseband processing circuit 130.

The baseband processing circuit 130 comprises a clock recovery circuit 116, an automatic frequency compensating (AFC) circuit 117, a subtractor 118, and a data recovery circuit 119. The instantaneous frequency signal is input to the clock recovery circuit 116, AFC circuit 117, and subtractor 118.

Operating at the frequency $f_2$ of the master clock signal, the clock recovery circuit 116 recovers a baseband data clock signal from the instantaneous frequency signal. The AFC circuit 117 and data recovery circuit 119 operate at timings given by this baseband data clock. The AFC circuit 117 and subtractor 118 detect and compensate for the difference (if any) between frequency $f_1$ and frequency $f_2/m$: the AFC circuit 117 detects this difference, and the subtractor 118 subtracts it from the instantaneous frequency signal. The data recovery circuit 119 recovers the transmitted data from the output of the subtractor 118. The recovered data and clock signals are output at respective output terminals 120 and 121 for use by further data-processing circuits.

The signals generated in the instantaneous phase detection circuit 105, differentiating circuit 115, and baseband processing circuit 130 are all digital signals. The outputs of the exclusive-OR gates 106 and 107, 1/m frequency divider 108, π/2 phase shifter 109, and clock recovery circuit 116 are one-bit logic signals or clock signals. The signals output by the other circuits are multiple-bit signals representing digital values.

Next a more detailed description will be given of the structure and operation of several of the circuits in FIG. 1. The detailed structure of the delay line 113, subtractors 114 and 118, clock recovery circuit 116, and data recovery circuit 119 will not be discussed, as these circuits are well known.

Instantaneous Phase Detection Circuit

First, the instantaneous phase detection circuit 105 will be described in further detail.

Exclusive-OR gate 106 compares the logic levels of the input FSK signal and the first clock signal, outputs a "zero" if these logic levels match, and outputs a "one" if they do not match. If the phase difference between the input FSK signal and the first clock signal is zero, their logic levels will always match and the bit stream output from exclusive-OR gate 106 will be continuously zero; if the phase difference is $\pi$ radians, their logic levels will always mismatch and the bit stream will be continuously "one;" and if the phase difference is between the zero and $\pi$, the bit stream will consist of a mixture of "zero's" and "one's" in proportion to the phase difference. Since it responds to the phase difference, this bit stream can be described as a first phase-difference-responsive signal.

The double-moving-average filter 110 is a low-pass filter that converts the abrupt variations between "zero" and "one" in the bit stream to more gradual variations between zero and a certain maximum value $P^2$ where $P^2$ represents the square of the length of the moving-average interval. When the input FSK signal is in-phase with the first clock signal and the bit stream output by exclusive-OR gate 106 is continuously zero, the first moving-average signal output by double-moving-average filter 110 is zero; when the FSK signal and first clock signal differ in phase by $\pi$ and the resulting bit stream is continuously "one," the first moving-average signal is $P^2$; when the phase difference is between the zero and $\pi$ and the first phase-difference-responsive signal is a mixture of "zero's" and "one's," the double-moving-average filter 110 outputs a corresponding value between zero and $P^2$.

Exclusive-OR gate 107 and double-moving-average filter 111 operate in the same way except that they use the second clock signal, which differs in phase from the first clock signal by $\pi/2$. The bit stream output by exclusive-OR gate 107 is a second phase-difference-responsive signal.

The polarity-control logic circuit 112 generates the instantaneous phase signal by reversing the sign of the first moving-average signal when the second moving-average signal is less than the midpoint value of $P^2/2$. The logic circuit 112 can be constructed using a comparator that tests the appropriate bit or bits of the second moving average signal to determine whether it is less than $P^2/2$, and a circuit that takes the two's complement of the first moving-average signal when the second moving-average signal is less than $P^2/2$.

Figure 2:
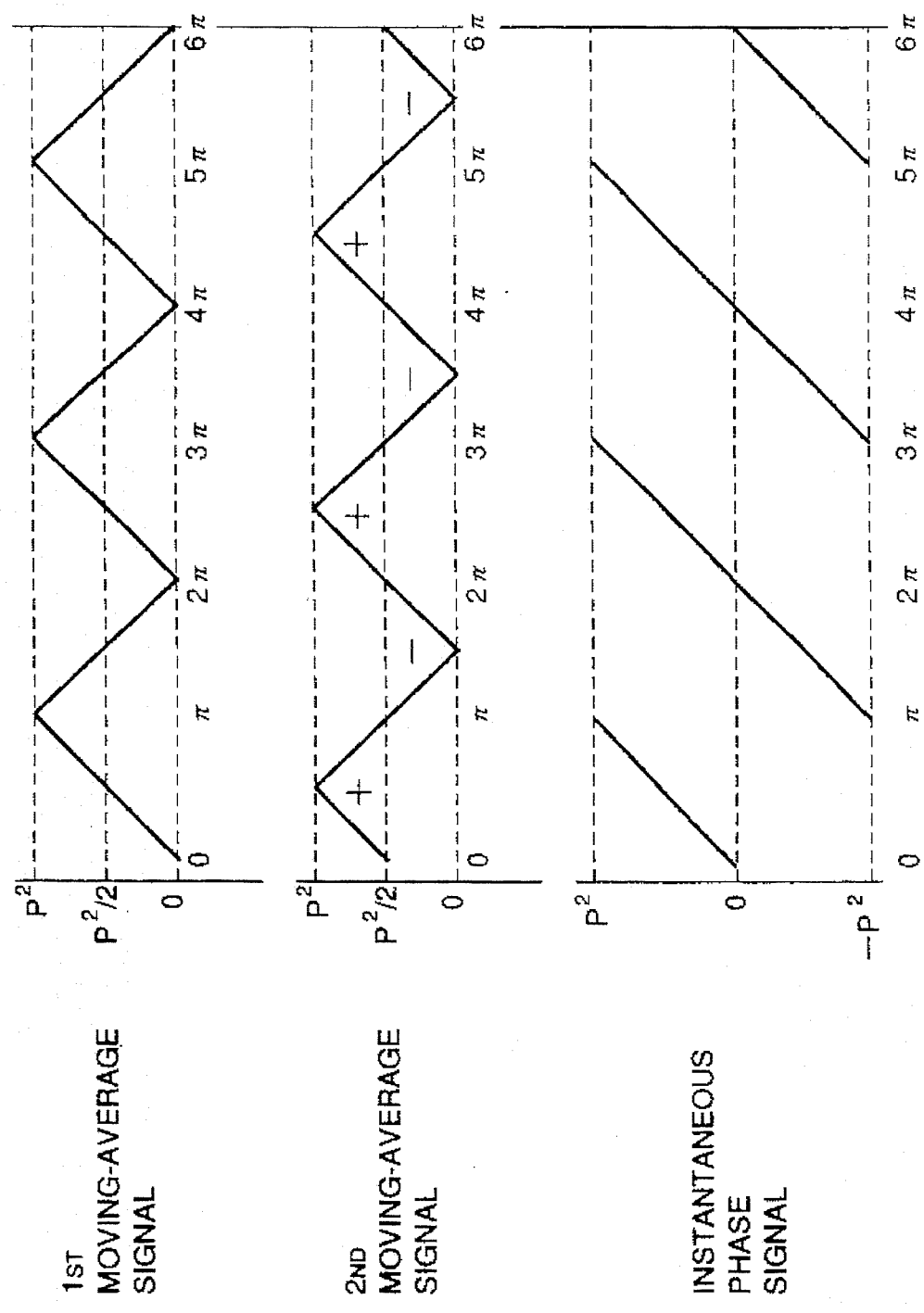
FIG. 2 illustrates the operation of the instantaneous phase detection circuit in FIG. 1.

The operation of the instantaneous phase detection circuit 105 is illustrated in FIG. 2. The horizontal axis in FIG. 2 indicates the instantaneous phase difference between the FSK signal and first clock signal. The vertical axis indicates the values of the two moving-average signals and the instantaneous phase signal output by the logic circuit 112. Since the first and second clock signals differ in phase by $\pi/2$, the first and second moving-average signals likewise differ in phase by $\pi/2$. The plus and minus signs shown near the second moving-average signal are the signs attached to the first moving-average signal to obtain the instantaneous phase signal.

The first moving-average signal represents the absolute phase difference between the FSK signal and the first clock signal, $p^2$ representing a phase angle of $\pi$ and $P^2/2$ a phase angle of $\pi/2$. When the FSK signal leads the first clock signal, which leads the second clock signal by $P^2/2$, the absolute phase difference between the FSK signal and second clock signal is at least $\pi/2$, so the second moving-average signal equals or exceeds $P^2/2$ and the instantaneous phase signal is identical to the first moving-average signal. When the FSK signal lags the first clock signal, the absolute phase difference between the FSK signal and the second clock signal is less than $\pi/2$, so the second moving-average signal is less than $P^2/2$ and the instantaneous phase signal is the negative of the first moving-average signal.

As can be seen from FIG. 2, the instantaneous phase signal responds linearly to the phase difference between the FSK signal and first clock signal in the $2\pi$ ranges from $-\pi$ to $\pi$, from $\pi$ to $3\pi$, from $3\pi$ to $5\pi$, and so on. Since phase is measured modulo $2\pi$, instantaneous phase is in effect detected linearly everywhere.

Figure 3:
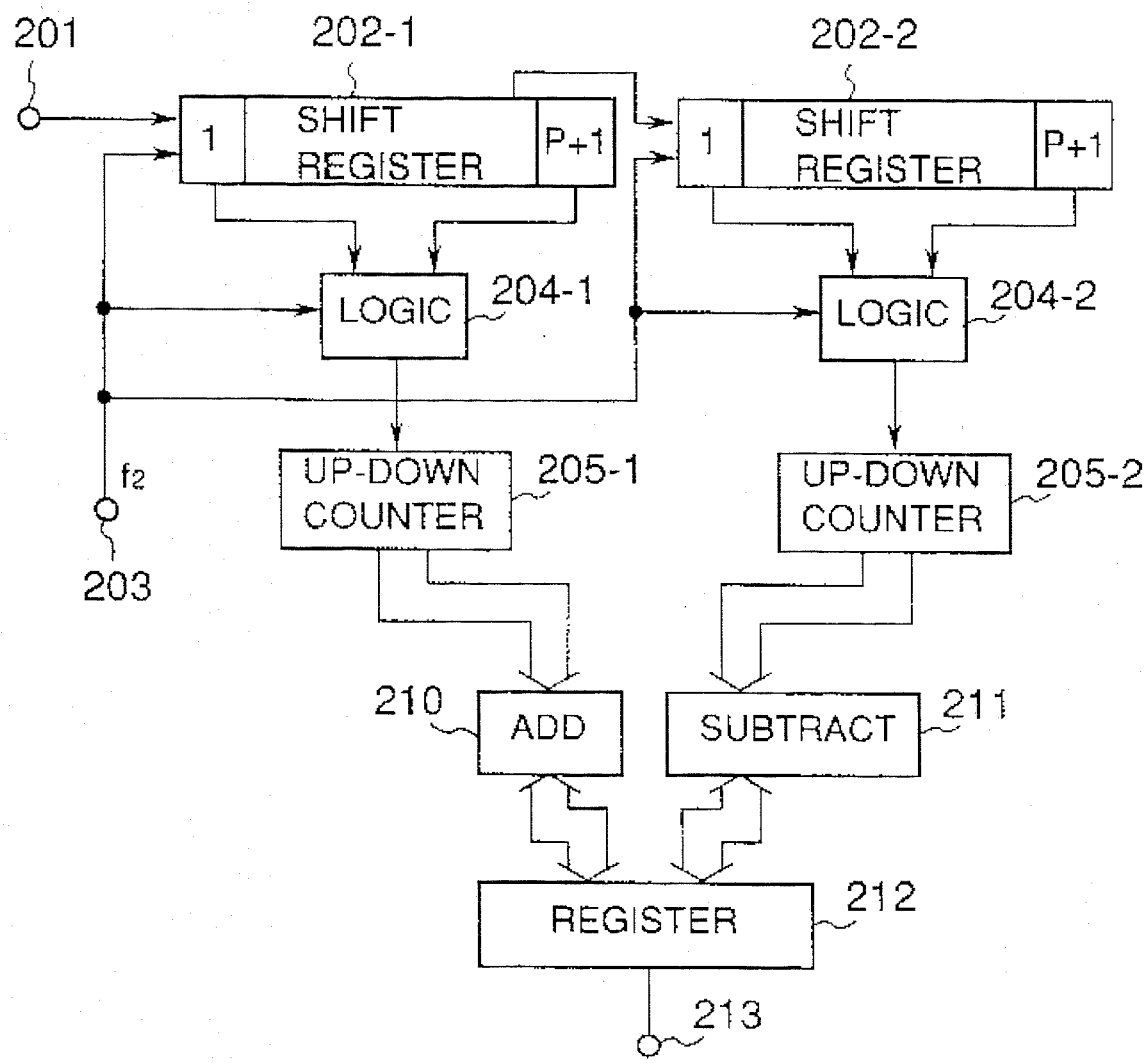
FIG. 3 is a block diagram of a double-moving-average filter.

FIG. 3 shows a filter circuit that can be used for the double-moving-average filters 110 and 111. This circuit comprises a pair of (P+1)-stage shift registers 202-1 and 202-2, a pair of logic circuits 204-1 and 204-2, a pair of up-down counters 205-1 and 205-2, an adder 210, a subtractor 211, and an output register 212.

The continuous bit stream from exclusive-OR gate 106 or 107 is received at all input terminal 201 and loaded into shift register 202-1 in synchronization with the master clock signal from the oscillator 102, which is supplied at input terminal 203. The bit in the penultimate (P-th) stage of shift register 202-1 is loaded into shift register 202-2, again in synchronization with the master clock signal.

The bit values in the first and last stages of shift register 202-1 are input to logic circuit 204-1 and compared at the timing of the master clock signal. The first value represents a bit that has just entered the moving-average interval covered by the first P stages of this shift register 202-1. The last value, namely the value in the (P+1)-th stage, represents a bit that has just left this interval. Logic circuit 204-1 increments up-down counter 205-1 if the first value is "one" and the second value is "zero," decrements up-down counter 205-1 if the first value is "zero" and the second value is "one," and leaves the value in up-down counter 205-1 unchanged if the two values are both "one" or both "zero." Up-down counter 205-1 accordingly holds the number of "one" bits in the first P stages of shift register 202-1. These P values cover an interval of time with a length $\tau$ equal to $P/f_2$.

Shift register 202-2, logic circuit 204-2, and up-down counter 205-2 operate in the same way. Up-down counter 205-2 holds the number of "one" bits received from input terminal 201 in the previous interval of length $\tau$.

Register 212 stores the final moving-average value, for output at an output terminal 213 as a moving-average signal. The adder 210 adds the count value of up-down counter 205-1 to the value of register 212, and the subtractor 211 subtracts the count value of up-down counter 205-2 from the value of register 212. These operations are analogous to the operations performed by the logic circuits 204-1 and 204-2, and are also performed in synchronization with the master clock signal. Register 212 accordingly holds the average number of "one's" in a moving interval of length $\tau$, totaled as the interval moves through a distance of $\tau$.

These operations actually obtain a double moving total instead of a double moving average. The total could be divided by a constant (P or $P^2$) to obtain a true double moving average, but working directly with the total simplifies the circuit configuration.

The length $\tau$ of the moving-average interval must be equal to or greater than the period $m/f_2$ of the first clock signal. Accordingly, P must be equal to or greater than m.

Differentiating Circuit

As explained above, the differentiating circuit 115 differentiates the instantaneous phase signal by taking the difference between delayed and undelayed versions of this signal. The delay may be one master clock period, or a fixed number of master clock periods, but it should be shorter than the baseband data period. That is, if the master clock frequency $f_2$ is N times the baseband data rate, the delay should be shorter than N master clock periods.

If the delay is sufficiently short, the output of the differentiating circuit 115 can be regarded as the derivative of the instantaneous phase signal, hence as an instantaneous frequency signal. This signal represents the instantaneous difference between the frequency of the FSK signal and the frequency $f_2/m$ of the first clock signal. For example, if the frequency of the FSK signal is equal to $f_2/m$, then the instantaneous phase signal output by the instantaneous phase detection circuit 105 will have a constant value and the instantaneous frequency signal output by the differentiating circuit 115 will be zero.

Figure 4A:
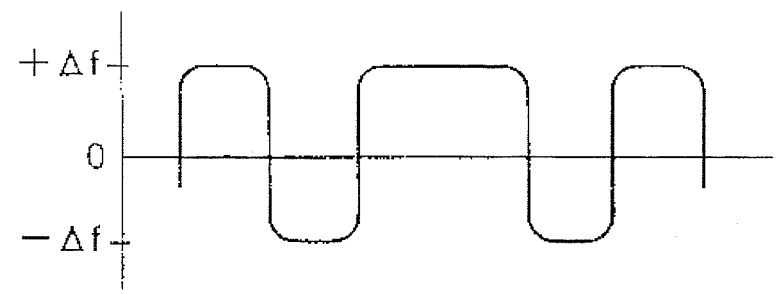
FIG. 4A shows an example of a binary FSK baseband signal.

FIG. 4A shows a typical example of the output of the differentiating circuit 115 for a binary FSK signal, when the first clock frequency $f_2/m$ is exactly equal to the center frequency $f_1$. The instantaneous frequency signal takes on values of $+\Delta f$ and $-\Delta f$, representing frequency shifts above and below $f_1$. Transitions between these two values require a certain amount of time, so the waveform in FIG. 4A is somewhat rounded, showing what would be seen on an oscilloscope after digital-to-analog conversion.

Figure 4B:
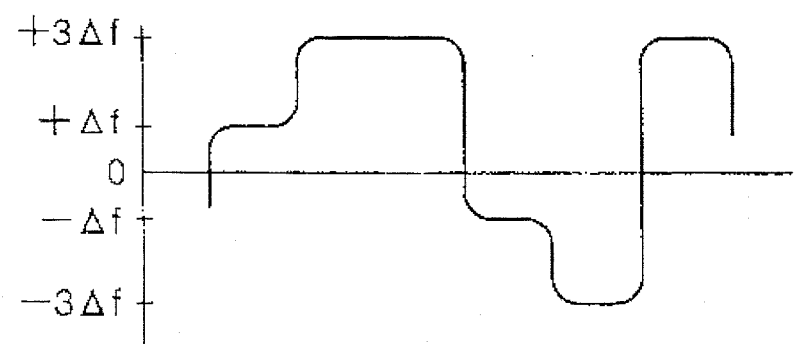
FIG. 4B shows an example of a quaternary FSK baseband signal.

FIG. 4B shows a typical output of the differentiating circuit 115 for a quaternary FSK signal, again assuming that $f_2/m$ equals $f_1$. The instantaneous frequency signal now takes on four values, corresponding to frequency shifts of $+3\Delta f$, $+\Delta f$, $-\Delta f$, and $-3\Delta f$.

Figure 5:
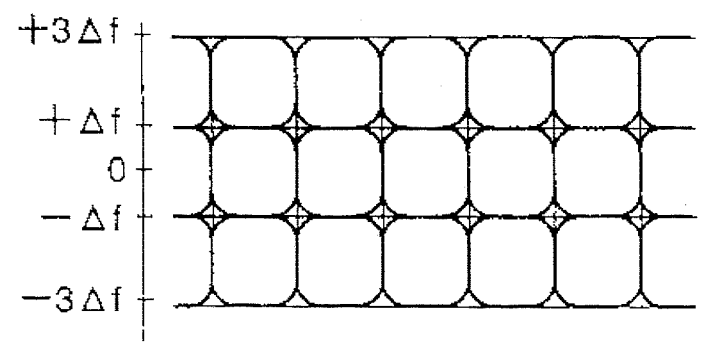
FIG. 5 is an eye-pattern diagram of the instantaneous frequency signal output from the differentiating circuit in FIG. 1.

FIG. 5 shows a so-called eye pattern for the quaternary FSK signal in FIG. 4B. The eye pattern is obtained by superimposing all possible trajectories of the instantaneous frequency signal.

The frequency difference $2\Delta f$ between adjacent frequencies to which the carrier signal is modulated in FIGS. 4A, 4B, and 5 will be referred to below as the FSK frequency separation.

AFC Circuit

Next, the AFC circuit 117 will be further described, tinder the assumption that the input modulated signal is a quaternary FSK signal.

The frequencies $f_1$ and $f_2/m$ are derived from master clock signals output by oscillators at the transmitter and receiver, respectively. As stated above, if these two frequencies are equal, the instantaneous frequency signal from the differentiating circuit 115 follows one of the paths on the eye pattern in FIG. 5.

Figure 6A:
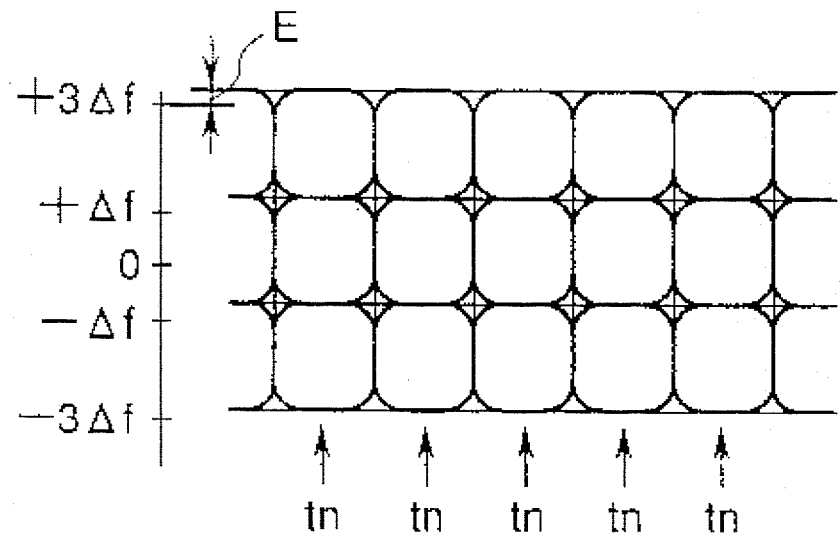
FIG. 6A is an eye-pattern diagram with positive frequency offset.

If $f_1$ and $f_2/m$ are not equal, however, then the eye pattern will be offset accordingly. If the transmitter's frequency $f_1$ is higher than the receiver's frequency $f_2/m$, the eye pattern will be offset upward by an amount E corresponding to the difference between $f_1$ and $f_2/m$, as shown in FIG. 6A. If the transmitting frequency is lower, the eye pattern will be offset downward by a negative difference E, as in FIG. 6B. The arrows labeled tn in FIGS. 6A and 6B identify timings generated by the clock recovery circuit 116.

Figure 6B:
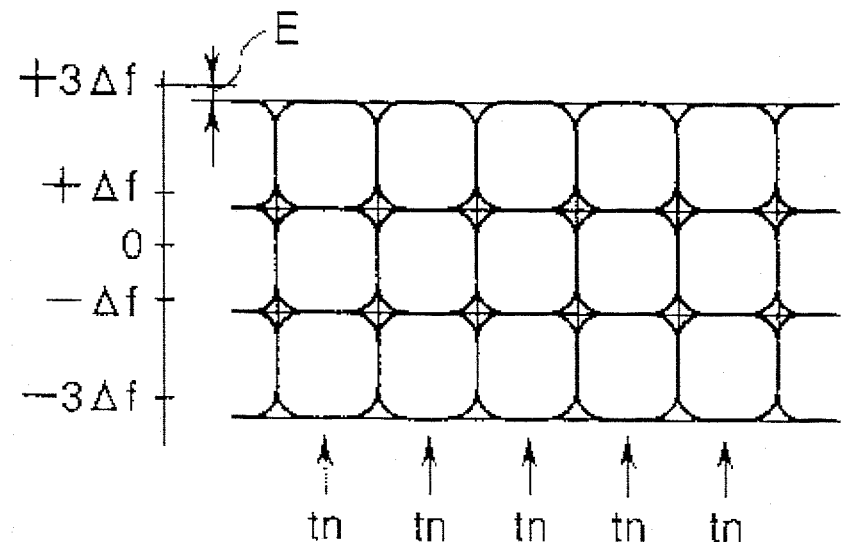
FIG. 6B is all eye-pattern diagram with negative frequency offset.

The AFC circuit 117 compensates for the offset E between the transmitter's and receiver's master clock frequencies, so that even if the instantaneous frequency signal output by the differentiating circuit 115 follows an offset eye pattern as in FIG. 6A or 6B, the signal supplied to the data recovery circuit 119 will follow the true eye pattern in FIG. 5.

The AFC circuit 117 compares the instantaneous frequency signal from the differentiating circuit 115 at the timings tn in FIGS. 6A and 6B with the four correct values $+3\Delta f$, $+\Delta f$, $-\Delta f$, and $-3\Delta f$, selects the closest of these four values, and takes the difference between it and the instantaneous frequency signal. This difference is averaged over a certain number of baseband clock cycles to estimate the frequency offset E. The frequency offset E is supplied to the subtractor 118 and subtracted from the instantaneous frequency signal output by the differentiating circuit 115, thereby canceling the frequency error.

As a result, the instantaneous frequency signal received by the data recovery circuit 119 has the correct eye pattern shown in FIG. 5, so the clock recovery circuit 116 and data recovery circuit 119 can recover the baseband data clock and data accurately. Note that the AFC circuit 117 operates as a feedforward circuit, obtaining the offset quantity E from the instantaneous frequency signal before the instantaneous frequency signal is adjusted by subtraction of E.

Figure 7:
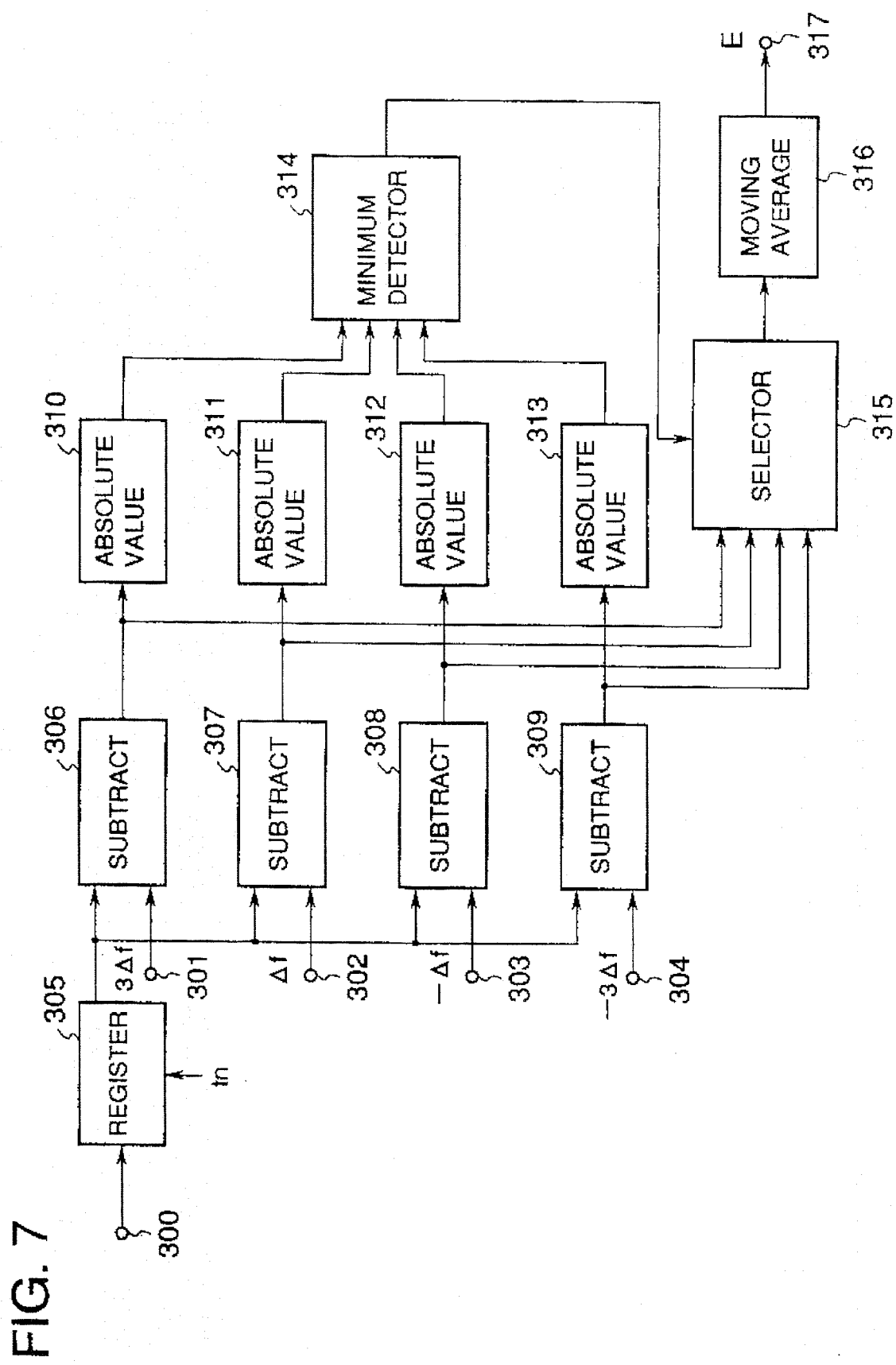
FIG. 7 is a block diagram of the automatic frequency compensation circuit in FIG. 1.

FIG. 7 shows a circuit that call be used as the AFC circuit 117. This circuit receives the instantaneous frequency signal at an input terminal 300, and the four correct frequency shift values $+3\Delta f$, $+\Delta f$, $-\Delta f$, and $-3\Delta f$ at respective terminals 301, 302, 303, and 304. The circuit comprises an input register 305, four differencing circuits 306, 307, 308, and 309, four absolute valuization circuits 310, 311, 312, and 313, a minimum detector 314, a selector 315, and a multiple-bit moving-average filter 316 that outputs the frequency offset signal E at an output terminal 317.

Register 305 latches the instantaneous frequency signal at the timing tn generated by the clock recovery circuit 116. Differencing circuits 306, 307, 308, and 309 obtain the differences between this signal and the correct values $+3\alpha f$, $+\Delta f$, $-\Delta f$, and $-3\Delta f$. The absolute valuization circuits 310, 311, 312, and 313 convert these differences to absolute values, among which the minimum detector 314 detects the minimum absolute value. The selector 315 is controlled by the minimum detector 314 so as to select the difference having this minimum absolute value. The multiple-bit moving-average filter 316 takes the moving average of the output of the selector 315 over a certain number of periods of the recovered baseband data clock, thereby obtaining the frequency offset signal E.

Figure 16:
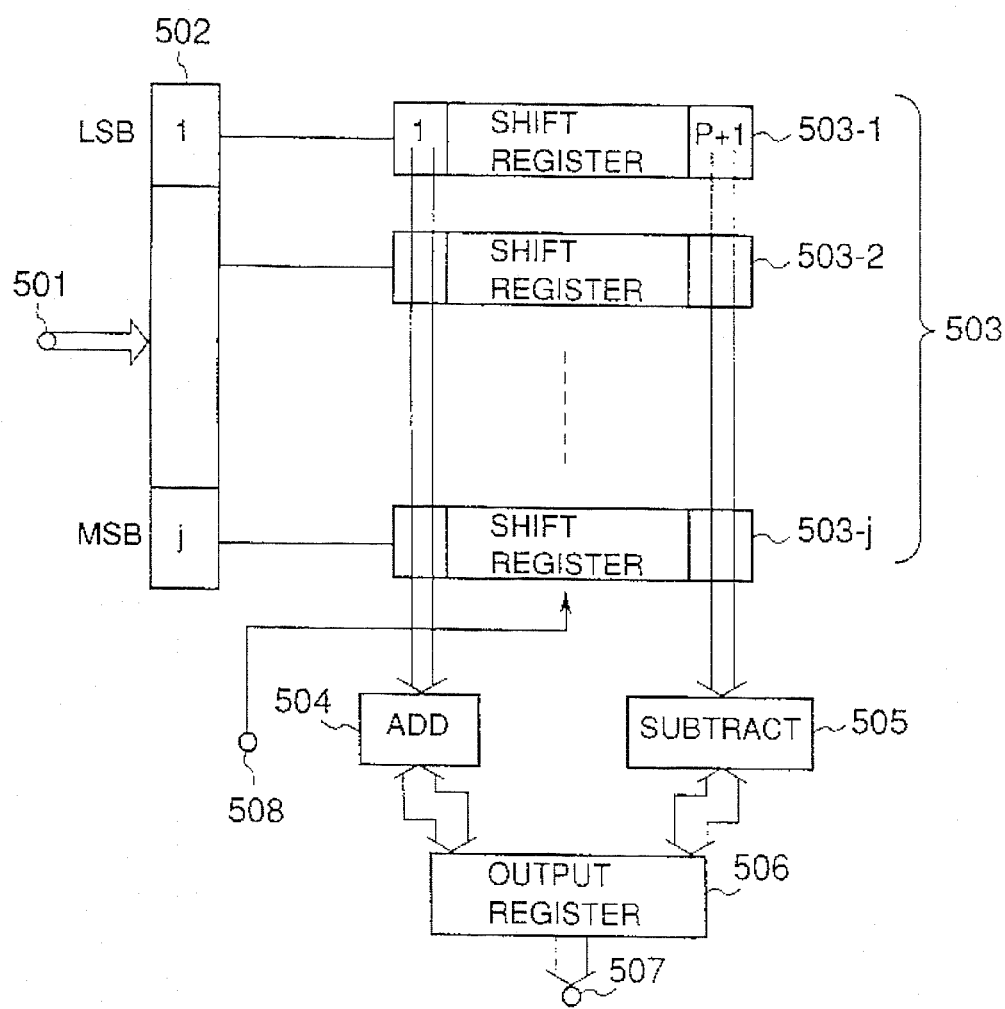
FIG. 16 is a block diagram of a multiple-bit single-moving-average filter.

A multiple-bit moving-average filter is a moving-average filter that operates on multiple-bit data values, instead of on a stream of "zero's" and "one's." A circuit that can be used as the multiple-bit moving-average filter 316 will be described later (FIG. 16).

To be corrected by this AFC circuit 117, the frequency offset E must be less than half the minimum FSK frequency separation. For example, E must be less than $\Delta f$ in FIGS. 6A and 6B.

Reason for Employing Double-Moving-Average Filters

It remains to explain the reason for using double-moving-average filters 110 and 111 instead of single-moving-average filters in the instantaneous phase detection circuit 105.

Taking a single moving average is equivalent to integrating over the moving-average interval, a process which attenuates higher-frequency components of the input signal.

Differentiation, however, which is the inverse of integration, amplifies higher frequencies by the same amount. Accordingly, if single-moving-average filters are used in the instantaneous phase detection circuit 105, the output of the differentiating circuit 115 has a generally flat frequency characteristic, with no net attenuation of high-frequency noise.

Taking a double moving average is equivalent to integrating twice, and provides double the attenuation of higher frequencies, so that even after differentiation, higher frequencies are still attenuated and the output of the differentiating circuit 115 contains less noise.

More precisely, for a single fixed input frequency f, the amplitude A of the output of a single-moving-average filter depends on the product of f and the length τ of the interval over which the moving average is taken, as follows.

$$A = \{2(1-\cos 2\pi f\tau)\}^{1/2}/(2\pi f\tau)$$

The envelope Aenv of this amplitude is found by substituting unity as a typical value for $1-\cos^2 \pi f\tau$, obtaining:

$$A_{env} = 2^{1/2}/2\pi f\tau$$

Accordingly, the output of a single-moving-average filter has an overall tendency to decrease in amplitude in proportion to the reciprocal of the input frequency. This gives the amplitude envelope a frequency characteristic of minus three decibels per octave (−3 dB/Oct). Since power is proportional to the square of amplitude, the power envelope has a frequency characteristic of minus six decibels per octave (−6 dB/Oct).

The power envelope of the differentiating circuit 115 has the opposite characteristic, increasing with frequency at a rate of six decibels per octave (+6 dB/Oct), so if single-moving-average filters were employed, the envelope characteristic at the output point of the differentiating circuit 115 would be generally flat. A detector of this type would be undesirably sensitive to high-frequency noise.

The power envelope of a double-moving-average filter, which performs two successive moving-average operations, has a −12 dB/Oct frequency characteristic. Use of double-moving-average filters 110 and 111 in the first embodiment thus provides a characteristic of −6 dB/Oct at the output point of the differentiating circuit 115, so that high-frequency noise is attenuated.

Advantages of the First Embodiment

The advantages of the above-described FSK detector can be summarized as follows.

The instantaneous phase detection circuit 105, differentiating circuit 115, and baseband processing circuit 130 are all digital circuits, so they are not sensitive to variations in the resistance, capacitance, and inductance values of circuit elements caused by variations in the fabrication process. As digital circuits, they are moreover well suited for large-scale integration.

Use of double-moving-average filters 110 and 111 in the instantaneous phase detection circuit 105 provides the instantaneous frequency signal from the instantaneous phase detection circuit 105 with a −6 dB/Oct envelope characteristic, which enables data to be recovered more accurately by reducing high-frequency noise.

The AFC circuit 117 and subtractor 118 compensate for offset between the center frequency $f_1$ of the input FSK signal and the first clock frequency $f_2/m$ generated by the detector, so that data can be recovered accurately without the need to generate precisely matched clock frequencies in the transmitting and receiving apparatus. It is only necessary for the frequency offset to be less than half the minimum separation between the FSK frequencies.

Second Embodiment

Next, a second novel FSK detector embodying the present invention will be described. This second embodiment can compensate for frequency offsets exceeding half the minimum FSK frequency separation, making it useful in communication systems in which the first embodiment would not operate reliably.

Figure 8:
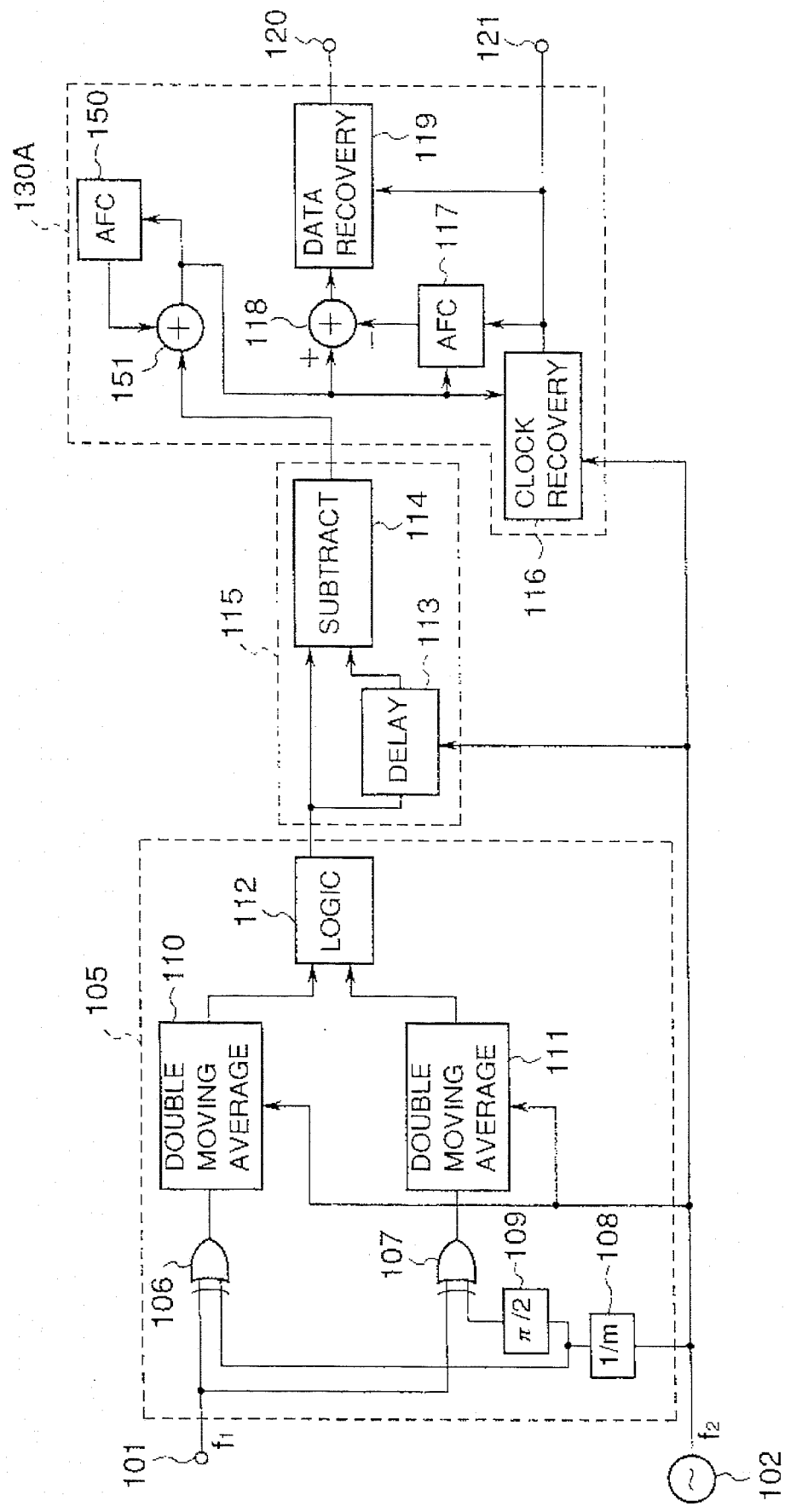
FIG. 8 is a block diagram of a second embodiment of the invention.

FIG. 8 shows the structure of this second embodiment, attaching the same reference numerals to parts that are identical or equivalent to parts in FIG. 1. The second embodiment in FIG. 8 differs from the first embodiment in FIG. 1 in the configuration of its baseband processing circuit 130A. The instantaneous phase detection circuit 105 and differentiating circuit 115 are structured as in the first embodiment and operate in the same way.

The baseband processing circuit 130A of the second embodiment comprises another AFC circuit 150 and an adder 151, in addition to the clock recovery circuit 116, AFC circuit 117, subtractor 118, and data recovery circuit 119 that were present in the first embodiment. AFC circuit 117 operates as a feedforward circuit as in the first embodiment, while AFC circuit 150 operates as a feedback circuit, receiving the sum output by the adder 151 and feeding a correction value back to the adder 151 to be added to the instantaneous frequency signal from the differentiating circuit 115.

The output of the adder 151 is supplied as an adjusted instantaneous frequency signal to the clock recovery circuit 116, subtractor 118, and feedback AFC circuit 150. The clock recovery circuit 116, feedforward AFC circuit 117, subtractor 118, and data recovery circuit 119 operate as in the first embodiment, except that they use this adjusted instantaneous frequency signal instead of the instantaneous frequency signal from the differentiating circuit 115.

The feedback AFC circuit 150 and adder 151 reduce the frequency offset E of the instantaneous frequency signal to a value within certain bounds, which are selected to be less than half the minimum FSK frequency separation. The feedforward AFC circuit 117 and subtractor 118 are then able to eliminate the remaining frequency offset.

Figure 9:
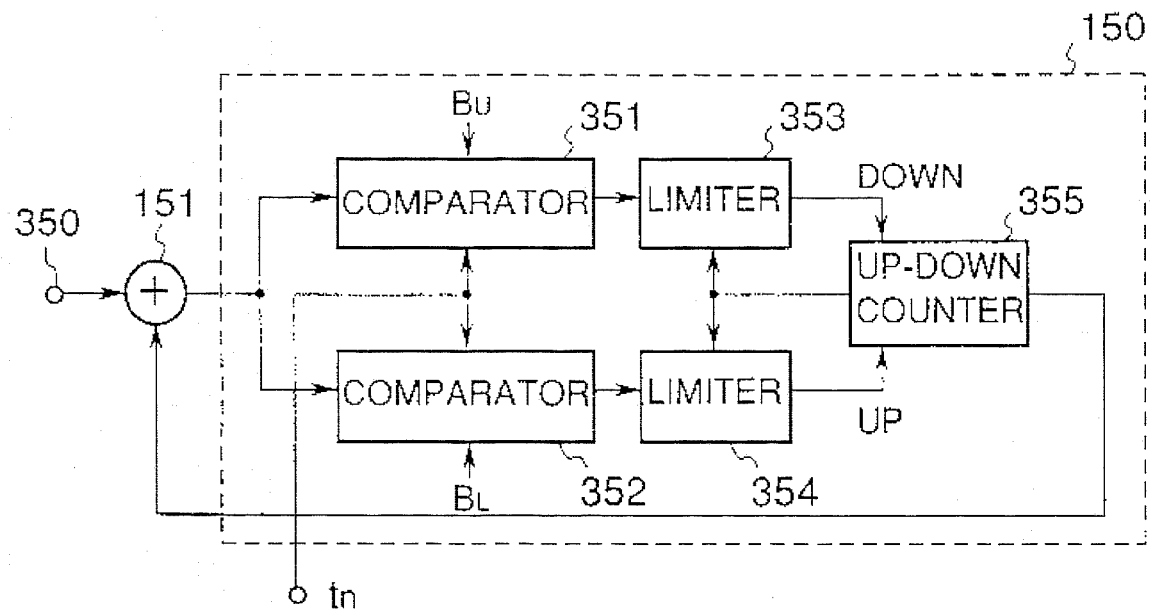
FIG. 9 is a block diagram of a feedback-type automatic frequency compensation circuit.
Figure 10:
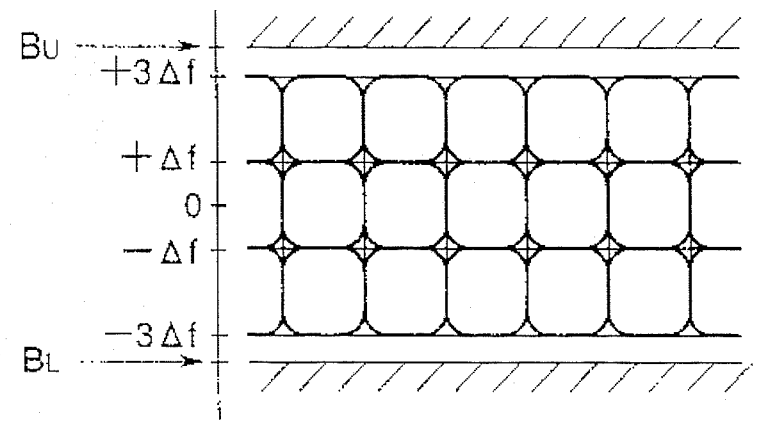
FIG. 10 is an eye-pattern diagram related to the operation of the second embodiment.

FIG. 9 shows the detailed structure of the feedback AFC circuit 150, together with the adder 151. The symbols $B_U$ and $B_L$ in this drawing denote upper and lower frequency bounds, which are illustrated in FIG. 10. FIG. 10 is similar to FIG. 5, showing the eye pattern when frequencies $f_1$ and $f_2/m$ are equal. The upper and lower frequency bounds satisfy the following conditions:

$$3\Delta f < B_U < 4\Delta f$$

$$-4\Delta f < B_L < -3\Delta f$$

Referring to FIG. 9, the feedback AFC circuit 150 comprises an upper-bound comparator 351, a lower-bound comparator 352, an upper limiter 353, a lower limiter 354, and an up-down counter 355.

The instantaneous frequency signal is received at an input terminal 350, adjusted in the adder 151, and supplied to the comparators 1351 and 352. The upper-bound comparator 351 compares the adjusted instantaneous frequency signal with the upper bound $B_U$ shown in FIG. 10. The lower-bound comparator 352 compares the adjusted instantaneous frequency signal with the lower bound $B_L$. These comparisons are performed at timings tn given by the baseband data clock signal from the clock recovery circuit 116.

If the adjusted instantaneous frequency signal exceeds the upper bound $B_U$, the upper-bound comparator 351 sends an output pulse to the upper limiter 353. If the up-down counter 355 can be decremented without underflowing, the upper limiter 353 passes this pulse on to the up-down counter, causing it to decrement. If the adjusted instantaneous frequency signal is less than the lower bound $B_U$, the lower-bound comparator 352 sends an output pulse to the lower limiter 354. If the up-down counter 355 can be incremented without overflowing, the lower limiter 354 passes this pulse on to the up-down counter 355, causing it to increment.

When the up-down counter 355 is at its maximum count value, it sends a signal to the lower limiter 354, causing the lower limiter 354 to block pulses from the lower comparator 352. Similarly, when the up-down counter 355 is at its minimum count value, it sends a signal to the upper limiter 353, causing the upper limiter 353 to block pulses from the upper comparator 351.

The count value output by the up-down counter 355 is fed back to the adder 151 to adjust the instantaneous frequency signal. The up-down counter 355 acts as a low-pass filter, since it cannot change faster than one count per cycle of the recovered baseband data clock, regardless of how rapidly the instantaneous frequency signal might change.

Referring to FIG. 10, if the first clock frequency $f_2/m$ exceeds the center frequency $f_1$ of the transmitter, the eye pattern of the instantaneous frequency signal moves upward. If the frequency difference exceeds the upper bound $B_U$, however, output pulses from the upper-bound comparator 351, relayed through the tipper limiter 353, decrement the up-down counter 355, thereby adjusting the eye pattern downward. Such pulses will be output each time the adjusted instantaneous frequency signal from the adder 151 exceeds the upper limit $B_U$. When the instantaneous frequency signal has been adjusted downward far enough that the entire eye pattern is below the tipper limit $B_U$, output of these incrementing pulses will cease.

Similarly, if the first clock frequency $f_2/m$ is less than the center frequency $f_1$ of the transmitter, the eye pattern in FIG. 10 will be shifted downward. If the frequency difference exceeds the lower bound $B_L$, output pulses from the lower-bound comparator 352, relayed through the lower limiter 354, will increment the up-down counter 355, thereby adjusting the eye pattern upward, until it is disposed entirely above the lower bound $B_L$.

When the eye pattern of the adjusted instantaneous frequency signal lies between the upper and lower bounds $B_U$ and $B_L$, no pulses are output from the comparators 351 and 352, and the up-down counter 355 retains its existing count value. Since the frequency offset in the adjusted instantaneous frequency signal is then less than $\Delta f$, it can be corrected by the feedforward AFC circuit 117 and subtractor 118.

The up-down counter 355 is preferably capable of counting up and down far enough to correct the largest anticipated frequency difference between $f_1$ and $f_2/m$, without overflowing or underflowing. Should larger frequency differences occur, the upper limiter 353 or lower limiter 354 blocks output pulses from the comparator 351 or 352, so that the up-down counter 355 remains at its maximum or minimum count value without overflowing or underflowing. The limiters 353 and 354 prevent the feedback AFt circuit 150 from operating erratically due to temporary conditions such as noise.

A general problem in high-speed AFC circuits is that, to respond rapidly to frequency changes, they must employ a low-pass filter with a high cut-off frequency. The result of a high cut-off frequency, however, is that besides compensating for frequency offset, the AFC circuit tends to produce additional noise. The feedback AFC circuit 150 avoids this problem by performing no correction at all as long as the adjusted instantaneous frequency signal is within the upper and lower bounds $B_U$ and $B_L$. It can therefore operate at high speed without adding extraneous noise to the instantaneous frequency signal.

The second embodiment provides the same advantages as the first embodiment, with the additional advantage of being able to compensate for larger frequency offsets. It can be used in communication systems in which there may be considerable difference between the transmitter's center frequency $f_1$ and the receiver's first clock frequency $f_2/m$.

Third Embodiment

Next, a third novel FSK detector embodying the present invention will be described. This third embodiment is adapted for higher-speed operation than the first and second embodiments.

The instantaneous phase detection circuit 105 in the preceding embodiments has a preferred center input frequency $f_1$. As mentioned above, the center frequency $f_1$ is substantially equal to $f_2/m$, where m is an integer. For a given master clock frequency $f_2$, if m is too small an integer, i.e. if $f_1$ is too high, the result will be inadequate sampling of the input signal and frequent errors in the recovered data. If $f_2$ is increased to overcome this problem, that will impose stringent requirements on the switching speed of transistors and other circuit elements in the instantaneous phase detection circuit 105, and current consumption will increase.

Too low an input frequency $f_1$ can also lead to increased data errors, by providing insufficient information for accurate detection of instantaneous phase. The input frequency should be neither too high nor too low. The preferred input frequency can be determined from such considerations as the performance characteristics of circuit elements and the low-pass filtering characteristics of the double-moving-average filters 110 and 111.

The third embodiment is advantageous when the frequency of the FSK signal is higher than the preferred input frequency of the instantaneous phase detection circuit.

Figure 11:
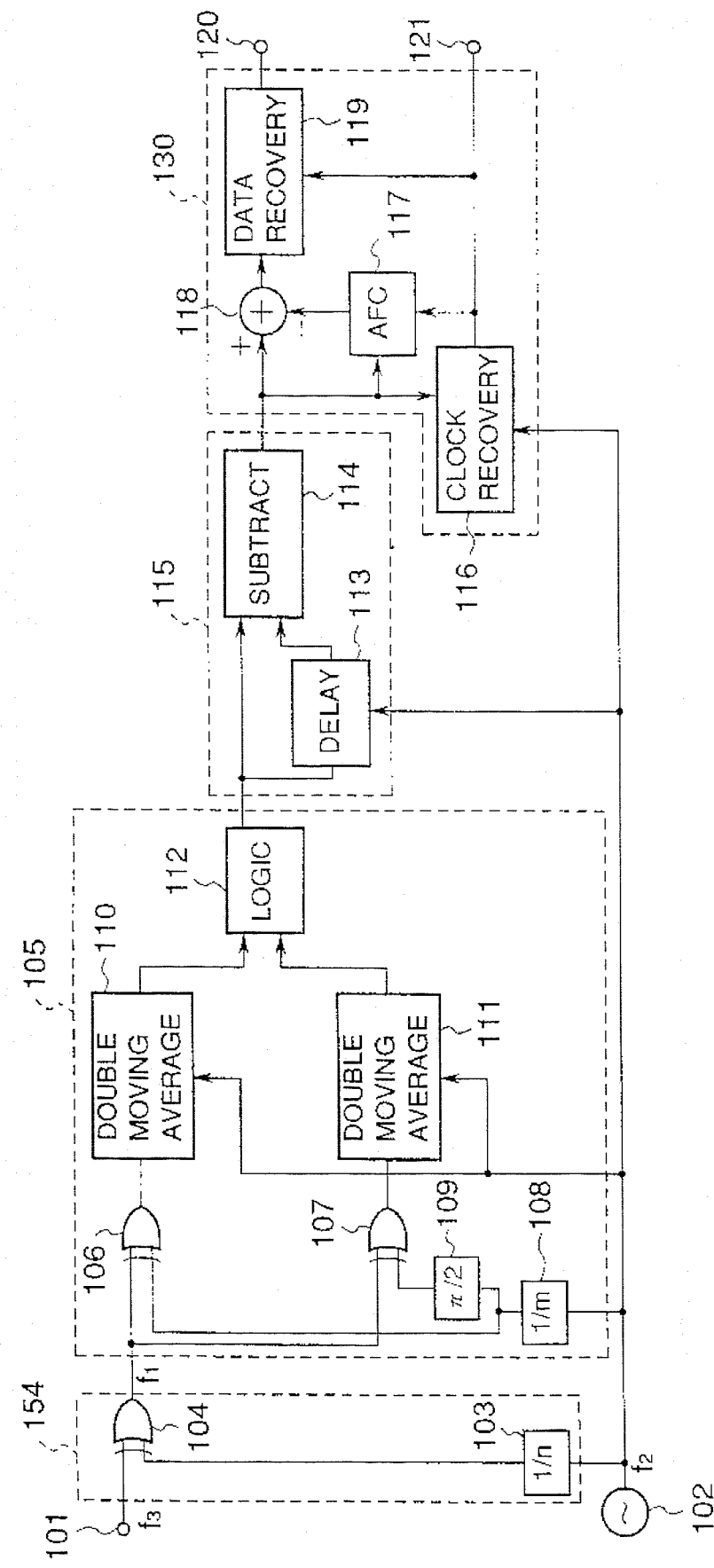
FIG. 11 is a block diagram of a third embodiment.

FIG. 11 shows the structure of this third embodiment, attaching the same reference numerals to parts that are identical or equivalent to corresponding parts in FIG. 1.

As can be seen by comparing FIGS. 11 and 1, the third embodiment has the same structure as the first embodiment with the addition of a 1/n frequency divider 103 and exclusive-OR gate 104. These elements constitute a frequency converter 154 that down-converts the frequency of the FSK signal. The center frequency of the FSK signal received at the input terminal 101 is now denoted $f_3$, while the down-converted frequency is denoted $f_1$.

The 1/n frequency divider 103 divides the master clock signal from the oscillator 102 to produce a clock signal with a frequency of $f_2/n$. The exclusive-OR gate 104 receives this $f_2/n$ signal from the 1/n frequency divider 103 and the FSK signal from the input terminal 101. The exclusive-OR gate 104 acts as a mixer, converting the center frequency $f_3$ of the FSK signal to a frequency $f_1$ equal to the difference between $f_3$ and $f_2/n$. This frequency $f_1$, or $f_3-f_2/n$, is the preferred input frequency of the instantaneous phase detection circuit 105.

With its frequency converted in this way, the FSK signal is supplied to the instantaneous phase detection circuit 105 and processed as in the first embodiment.

As in the preceding embodiments, the center frequency $f_1$, or $f_3-f_2/n$, input to the instantaneous phase detection circuit 105 must be substantially equal to the frequency $f_2/m$ of the first clock signal output from the 1/m frequency divider 108. In addition, the master clock frequency $f_2$ must be an integer multiple of the baseband data rate. Accordingly, the following equations must be satisfied, where m, n, and N are integers.

$$f_3-f_2/n=f_2/m$$

$$f_2=N\times\text{data rate}$$

As an example, suppose that the FSK signal has a center frequency $f_3$ of 10.8 MHz and bit rate of 384 kilobits per second (192 kilobaud for a quaternary FSK signal), and that the preferred input frequency of the instantaneous phase detection circuit 105 is 1.2 MHz. The two equations above can then be satisfied with a master clock frequency $f_2$ of 19.2 MHz, using the integer values m=16, n=2, and N=50 (N=100 for quaternary FSK).

The third embodiment offers the same advantages as the first embodiment, with the further advantage of being able to detect higher-frequency FSK signals. It accordingly provides a high-speed FSK detector that is insensitive to fabrication-process variability and suitable for large-scale integration.

Fourth Embodiment

Next, a fourth novel FSK detector embodying the present invention will be described. This fourth embodiment is similar to the third embodiment, but places fewer constraints on the master clock frequency $f_2$.

The constraints on $f_2$ in the third embodiment are the requirement for integers m, n, and N satisfying the two equations given above. For some values of the center frequency $f_3$ of the FSK signal, a frequency $f_2$ satisfying these constraints would be impractically high. For example, if $f_3$ is 10.7 MHz instead of the 10.8 MHz mentioned in the third embodiment, for the same data rate of 384 kilobits per second and preferred frequency of about 1.2 MHz for $f_2/m$, suitable values of $f_2$, n, m, and N are not available.

The fourth embodiment overcomes this problem by removing the constraint that the master clock frequency $f_2$ must be an integer multiple of the data rate.

Figure 12:
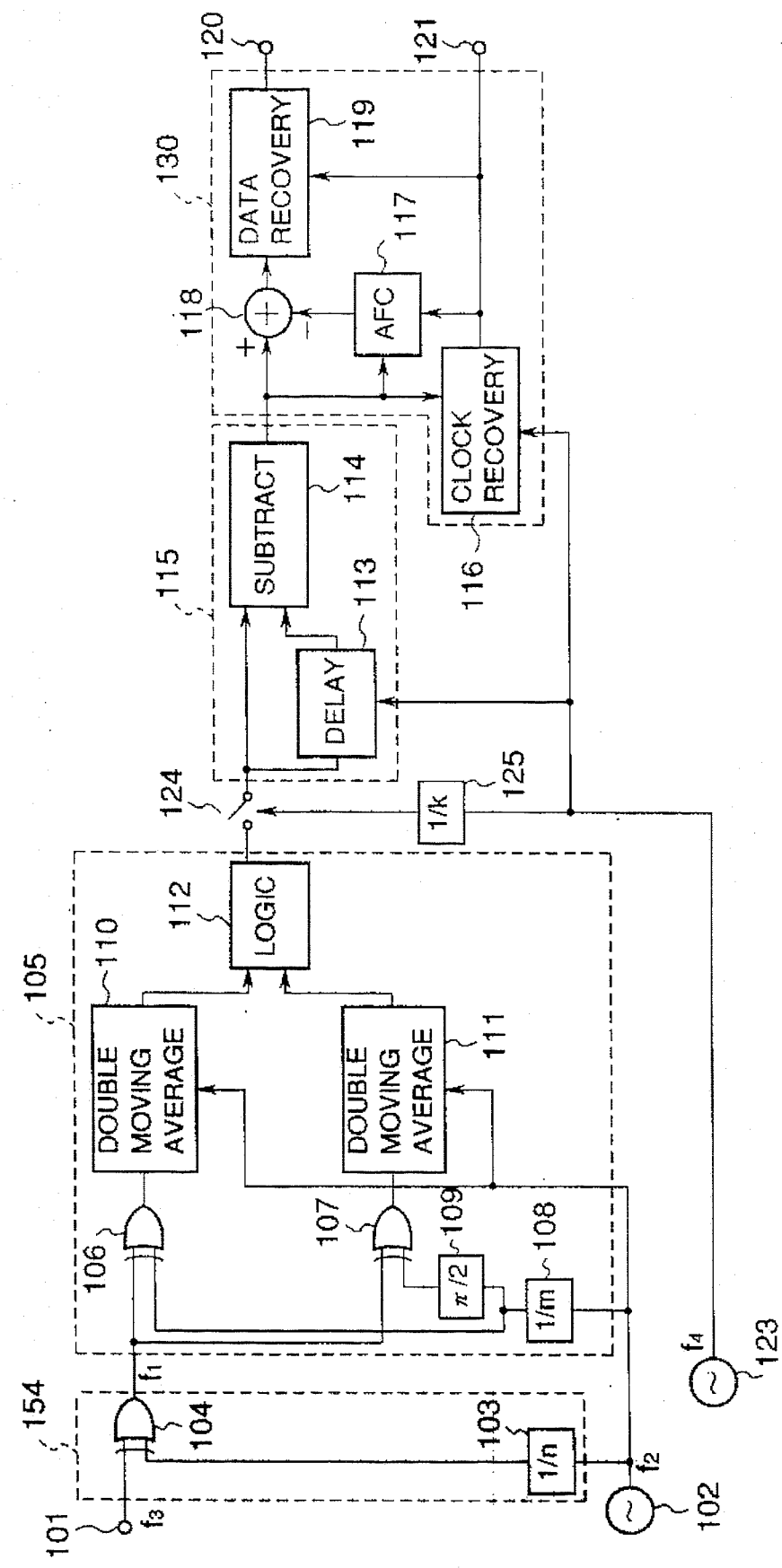
FIG. 12 is a block diagram of a fourth embodiment.

FIG. 12 shows the structure of this fourth embodiment. The new elements are a second oscillator 123, a sampling circuit 124, and a 1/k frequency divider 125. The other elements are the same as in the third embodiment, and have the same reference numerals as in FIG. 11.

The second oscillator 123 outputs a second master clock signal having a frequency $f_4$ that is an integer multiple of the data rate. This second master clock signal is supplied to the 1/k frequency divider 125, the delay line 113, and the clock recovery circuit 116. The 1/k frequency divider 125 divides the frequency $f_4$ of this second master clock signal by an integer k and furnishes it to the sampling circuit 124.

The sampling circuit 124 is interposed in series between the instantaneous phase detection circuit 105 and differentiating circuit 115. Driven by the divided clock signal from the 1/k frequency divider 125, the sampling circuit 124 samples the instantaneous phase signal from the instantaneous phase detection circuit 105 at a rate of $f_4/k$. Accordingly, while the instantaneous phase detection circuit 105 updates the instantaneous phase signal at a rate of $f_2$, the instantaneous phase signal output by the sampling circuit 124 is updated at a rate of $f_4/k$.

The delay line 113 and clock recovery circuit 116 operate at the second master clock frequency $f_4$, in synchronization (by a factor of k) with the sampling circuit 124. The operating frequency $f_4$ of the clock recovery circuit 116 is moreover an integer multiple of the data rate. This enables the instantaneous phase signal to be differentiated correctly in the differentiating circuit 115, the baseband data clock to be recovered correctly by the clock recovery circuit 116, and the data to be recovered correctly by the data recovery circuit 119.

If the center frequency $f_3$ of the FSK signal is 10.7 MHz, the condition $f_3-f_2/n=f_2/m$ can be satisfied with a master clock frequency $f_2$ of 19.0222 MHz, using integer values m=16 and n=2. The second master clock frequency $f_4$ can be any suitable multiple of the data rate, e.g. 19.2 MHz for a data rate of 384 kilobits per second, and the integer k can be any suitable positive integer.

Since the instantaneous phase detection circuit 105 operates at a frequency $f_2$ of 19.0222 MHz while the differentiating circuit 115 and clock recovery circuit 116 operate at a frequency $f_4$ of 19.2 MHz, phase detection is not synchronous with the differentiation and clock recovery operations. Sampling by the sampling circuit 124, however, is synchronous with differentiation and clock recovery, so differentiation and clock recovery are unaffected by the timing of instantaneous phase detection.

Since high-frequency components are removed from the instantaneous phase signal by the double-moving-average filters 110 and 111, the frequency band in which data are present is extremely small in relation to the output rate $f_2$ of the instantaneous phase detection circuit 105. There is, accordingly, substantially no degradation of data quality due to foldover, even though this output rate $f_2$ is not synchronous with the $f_4/k$ rate of the sampling circuit 124.

Other than the differences described above, the fourth embodiment operates like the third embodiment and provides the same advantages. Moreover, it can detect FSK signals with arbitrary center frequencies $f_3$, regardless of the data rate.

Fifth Embodiment

Next, a fifth novel FSK detector embodying the present invention will be described. This fifth embodiment is similar to the fourth embodiment, but inserts the sampling circuit 124 between the differentiating circuit 115 and baseband processing circuit 130.

Figure 13:
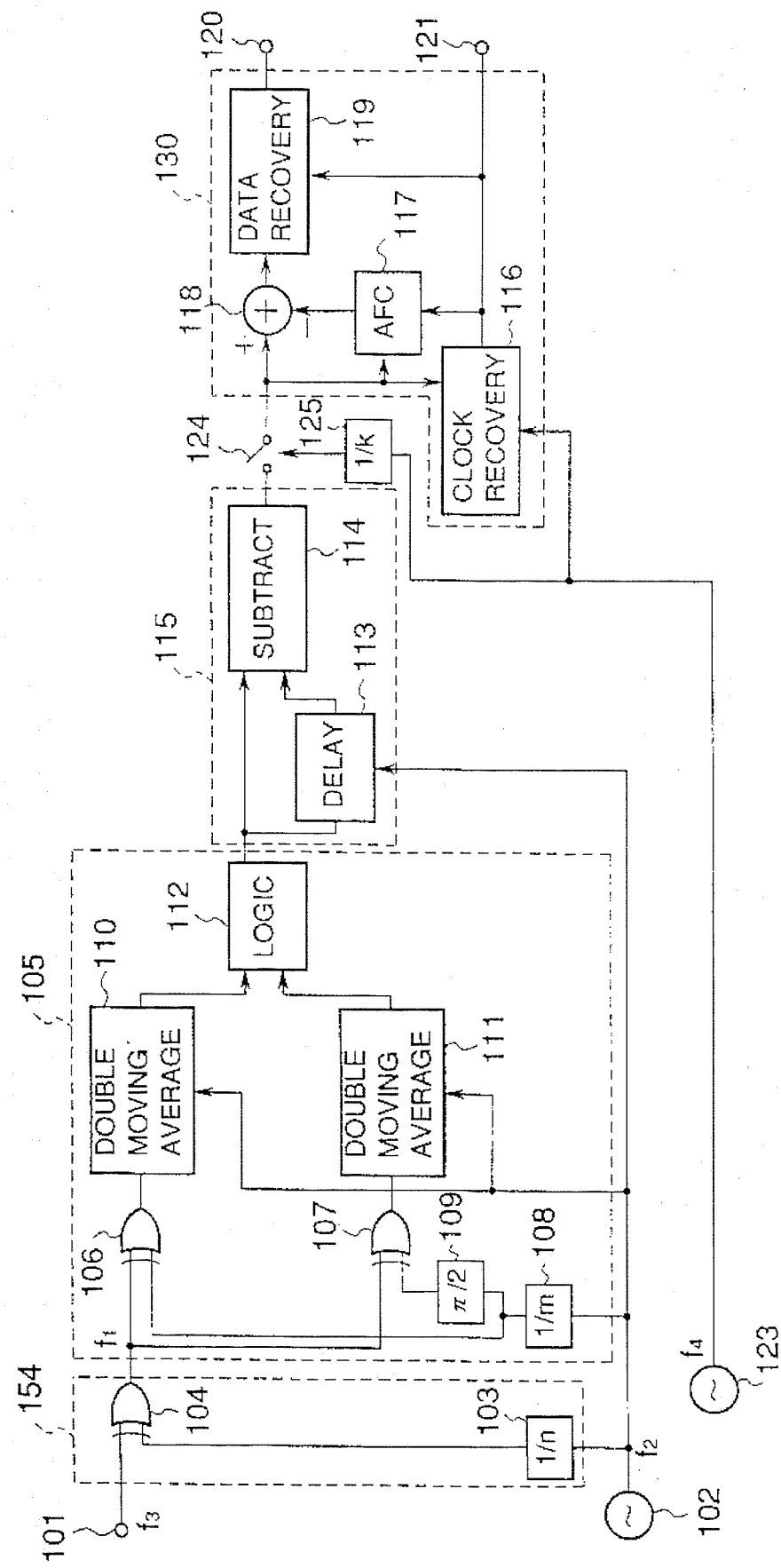
FIG. 13 is a block diagram of a fifth embodiment.

FIG. 13 shows the structure of this fifth embodiment, using the same reference numerals as in FIG. 12 to identify identical or equivalent parts.

As can be seen from a comparison of FIG. 12 and FIG. 13, the fifth embodiment differs from the fourth embodiment only in the location of the sampling circuit 124. In the fifth embodiment, the sampling circuit 124 samples the output of the differentiating circuit 115 instead of the output of the instantaneous phase detection circuit 105, and the output of the sampling circuit 124 is provided to the baseband processing circuit 130. The instantaneous phase detection circuit 105 and differentiating circuit 115 operate at master clock frequency $f_2$, using the master clock signal from the oscillator 102. The sampling circuit 124 and clock recovery circuit 116 operate at a frequency based on the second master clock frequency $f_4$ generated by the second oscillator 123.

Aside from this difference, the fifth embodiment operates in the same way as the fourth, and provides the same advantage of accepting an FSK signal with an arbitrary center frequency $f_3$.

Sixth Embodiment

Next, a sixth novel FSK detector embodying the present invention will be described. This sixth embodiment inserts a moving-average filter between the differentiating circuit 115 and baseband processing circuit 130.

Figure 14:
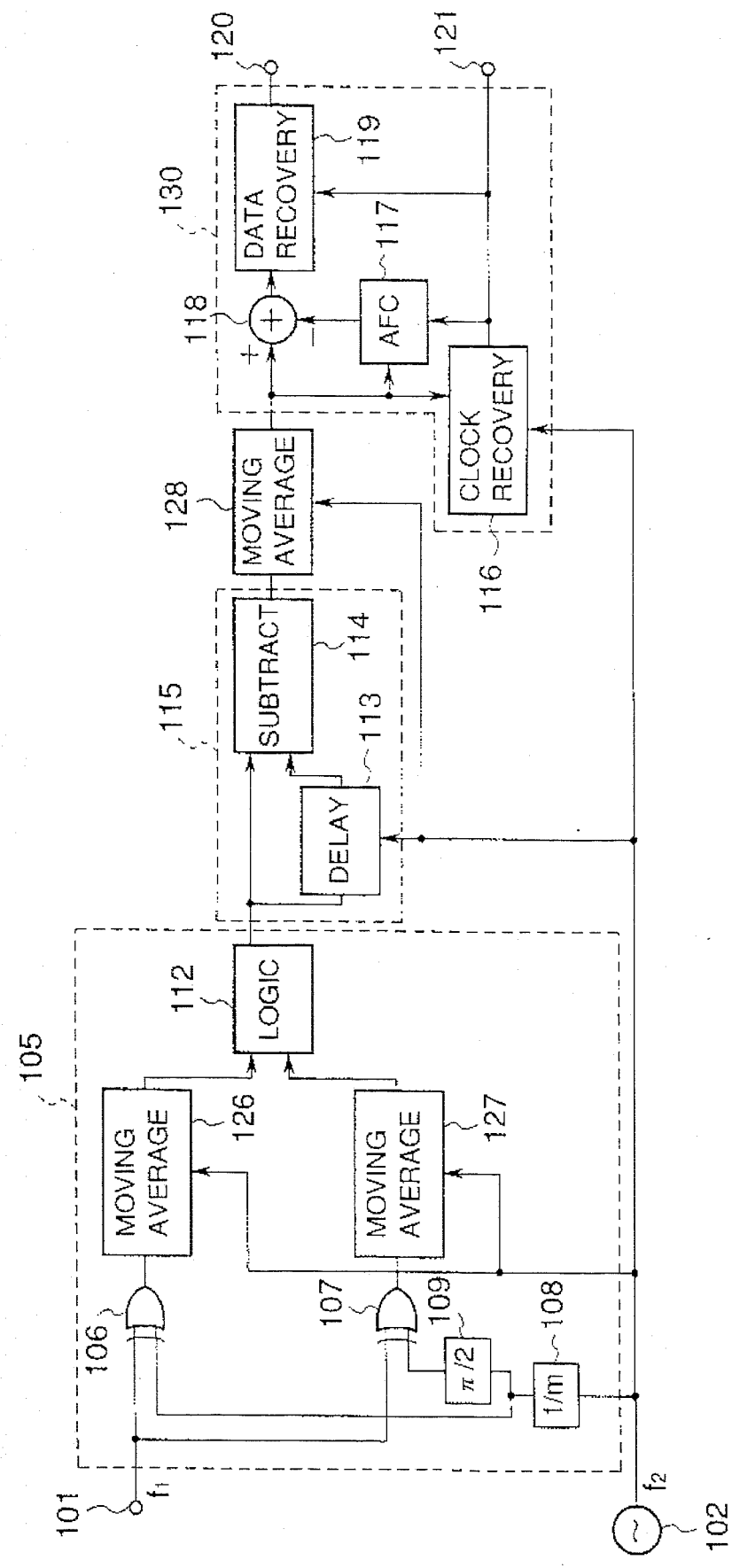
FIG. 14 is a block diagram of a sixth embodiment.

FIG. 14 shows the structure of this sixth embodiment, using the same reference numerals as in FIG. 1 to identify elements that appeared in the first embodiment. The new elements are single-moving-average filters 126 and 127, which replace the double-moving-average filters 110 and 111 of the first embodiment, and another single-moving-average filter 128, which filters the instantaneous frequency signal output by the differentiating circuit 115 before input of this signal to the baseband processing circuit 130.

Moving-average filter 128 differs from moving-average filters 126 and 127 in that whereas the latter receive serial bit streams, the instantaneous frequency signal received by moving-average filter 128 from the differentiating circuit 115 is a multiple-bit signal. Preferred structures of these moving-average filters are shown in FIGS. 15 and 16.

Figure 15:
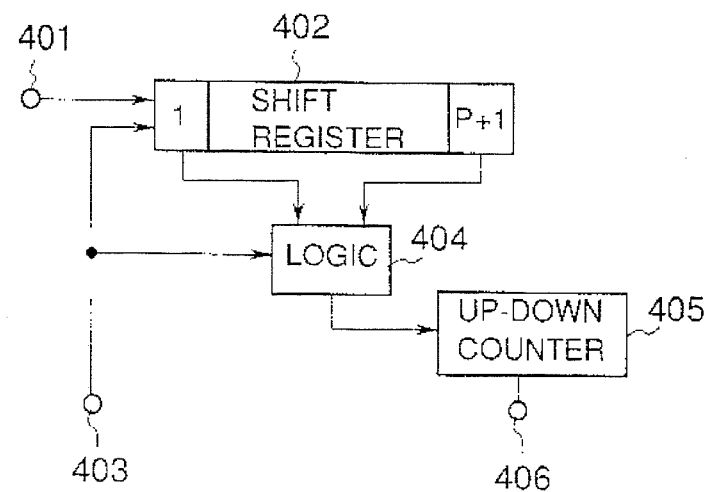
FIG. 15 is a block diagram of a single-moving-average filter.

Referring to FIG. 15, each of the single-moving-average filters 126 and 127 comprises a (P+1)-stage shift register 402, a logic circuit 404, and an up-down counter 405.

The phase-difference-responsive signal output from exclusive-OR gate 106 or 107 is received at an input terminal 401 and loaded into shift register 402 in synchronization with the master clock signal from the oscillator 102, which is supplied from a clock terminal 403. The values in the first stage and last stage of shift register 402 are input to the logic circuit 404 and compared at the timing of the master clock signal. The logic circuit 404 increments the up-down counter 405 if the first-stage value is "one" and the last-stage value is "zero," decrements the up-down counter 405 if the first-stage value is "zero" and the last-stage value is "one," and leaves the up-down counter 405 unchanged if the first-stage and last-stage values are the same.

The up-down counter 405 accordingly holds the total number of "one's" in the first P stages of the shift register 402, representing the number of "one's" in an interval of time of length τ in the input bit stream. This value is supplied to an output terminal 406.

Use of single-moving-average filters 126 and 127 implies a slight modification to FIG. 2, in that the maximum and middle values of the outputs of these filters are P and P/2 instead of $P^2$ and $P^2/2$.

Referring to FIG. 16, single-moving-average filter 128 is essentially a multiple-bit version of the filter in FIG. 15. The instantaneous frequency signal is received at an input terminal 501 as a multiple-bit input signal (indicated as j bits in the drawing). The filter comprises an input register 502, a j-bit (P+1)-stage shift register 503 (consisting of 1-bit shift registers 503-1 to 503-j), an adder 504, a subtractor 505, and an output register 506.

The j-bit instantaneous frequency signal from the differentiating circuit 115 is loaded into the input register 502 in synchronization with the master clock signal from the oscillator 102, then input into the j-bit shift register 503 and shifted in synchronization with the same master clock signal. The output register 506 stores the total of the j-bit values in the first P stages of the j-bit shift register 503, and outputs it as a moving-average signal at an output terminal 507.

Each time a new j-bit value is shifted into the j-bit shift register 503, the adder 504 adds this value to the contents of the output register 506, and the subtractor 505 subtracts the j-bit value shifted from the P-th stage to the (P+1)-th stage of the shift register 503 from the contents of the output register 506, so that the output register 506 continues to hold the correct total of the first P stages of the j-bit shift register 503.

Referring again to FIG. 14, the power envelopes of the moving average filters 126, 127, and 128 have −6 dB/Oct frequency characteristics, as explained earlier, while the differentiating circuit 115 has a +6 dB/Oct characteristic. This provides a net characteristic of −6 dB/Oct at the input point to the baseband processing circuit 130, so that high-frequency noise present in the original FSK signal is attenuated as in the first embodiment. Moreover, additional high-frequency distortion produced by the differentiating circuit 115, which was not attenuated in the first embodiment, is now removed by the moving-average filter 128. The sixth embodiment accordingly provides a better signal-to-noise ratio than in the first embodiment, resulting in a lower data error rate.

Taking a second moving average after differentiation in the differentiating circuit 115 is a low-pass filtering operation, and does not change the basic operation of the detector. If there is no carrier-frequency offset between the transmitter and receiver, for example, the eye pattern of the output signal of the multiple-bit moving-average filter 128 will be as shown in FIG. 5. The baseband processing circuit 130 operates as in the first embodiment.

The sixth embodiment has the same advantages as the first embodiment, with the further advantage of a lower error rate, due to filtering of the instantaneous frequency signal before input to the baseband processing circuit 130.

Incidentally, while the sixth embodiment permits the use of single-moving-average filters 126 and 127 in the instantaneous phase detection circuit 105, it does not require this. The instantaneous phase detection circuit 105 could employ the same double-moving-average filters 110 and 111 as in the first embodiment, providing a net −12 dB/Oct characteristic at the point of input to the baseband processing circuit 130.

The first six embodiments can be combined in various ways to produce the following further embodiments. Detailed descriptions of these embodiments will be omitted, as their operation will be clear from the descriptions so far.

Seventh Embodiment

Figure 17:
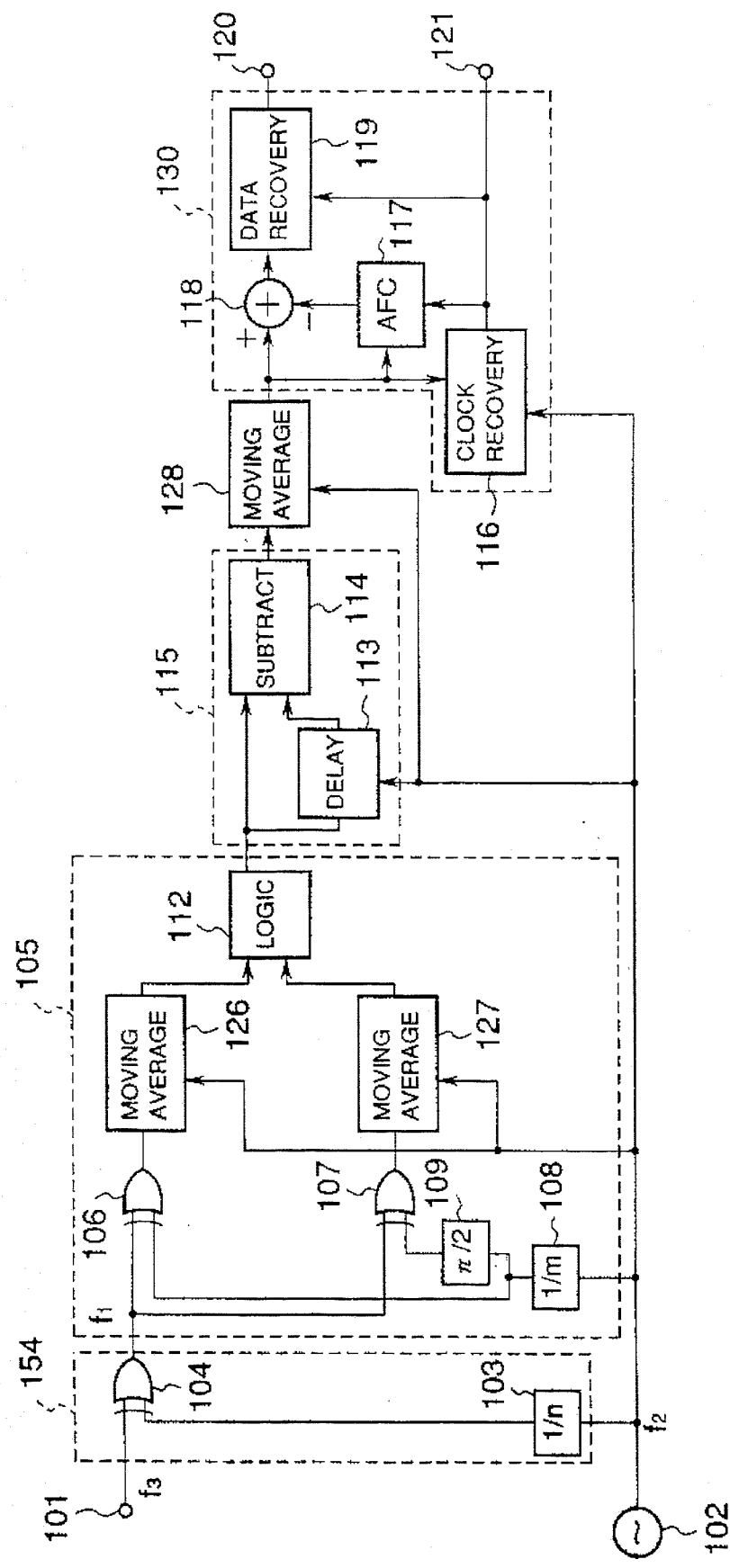
FIG. 17 is a block diagram of a seventh embodiment of the invention.

FIG. 17 shows the structure of a seventh embodiment. The seventh embodiment adds the frequency converter 154 of the third embodiment to the structure of the sixth embodiment, thereby permitting higher-frequency FSK signals to be detected.

Eighth Embodiment

Figure 18:
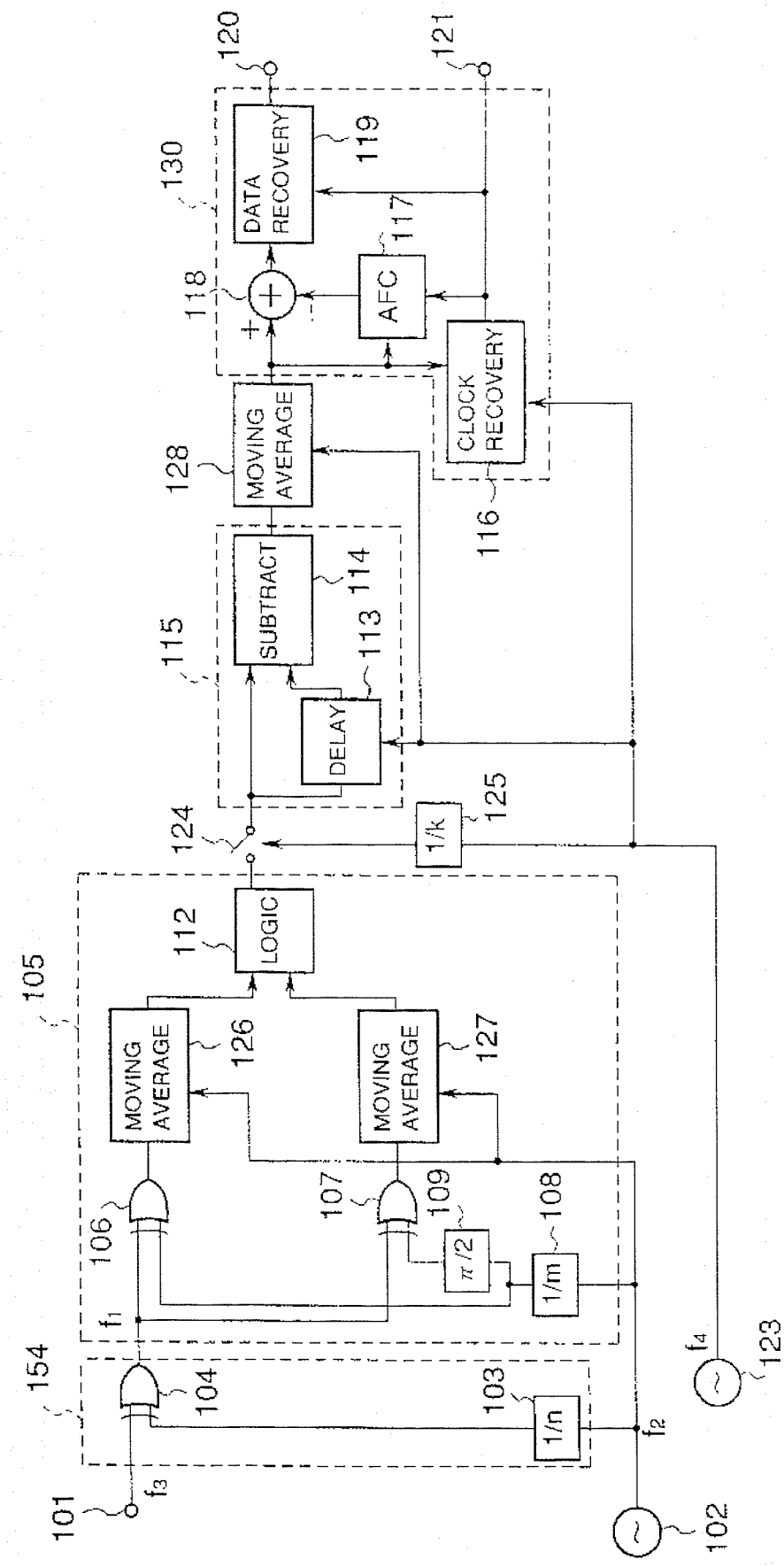
FIG. 18 is a block diagram of an eighth embodiment.

FIG. 18 shows the structure of an eighth embodiment. The eighth embodiment adds a second oscillator 123, sampling circuit 124, and 1/k frequency divider 125 to the structure of the seventh embodiment, thereby removing the constraint that the master clock frequency $f_2$ must be an integer multiple of the baseband data rate. That is, the eighth embodiment combines the features of the fourth and sixth embodiments.

Ninth Embodiment

Figure 19:
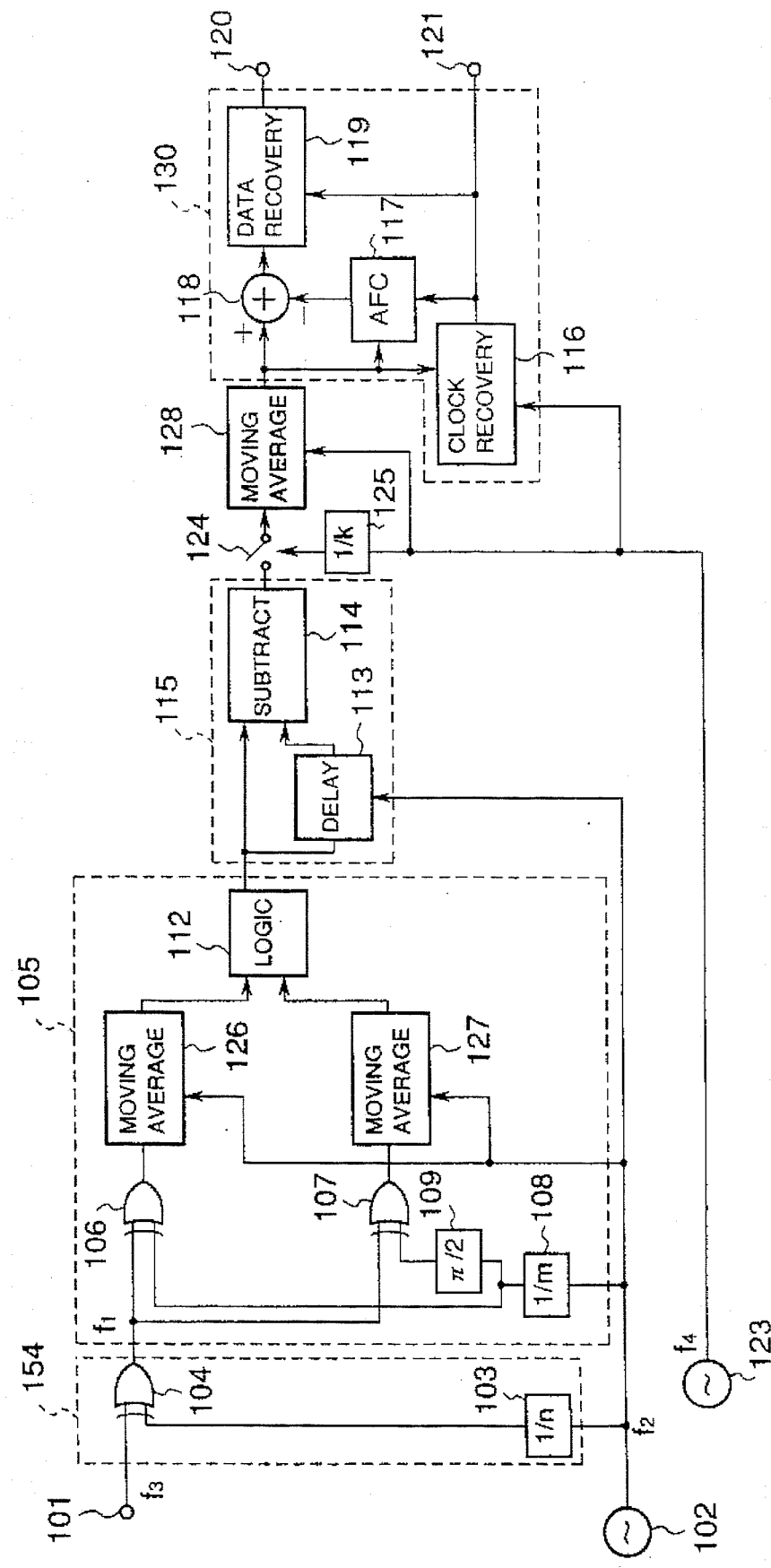
FIG. 19 is a block diagram of a ninth embodiment.

FIG. 19 shows the structure of a ninth embodiment. The ninth embodiment moves the sampling circuit 124 of the eighth embodiment to a position between the differentiating circuit 115 and baseband processing circuit 130, thereby combining the features of the fifth and sixth embodiments.

Tenth Embodiment

Figure 20:
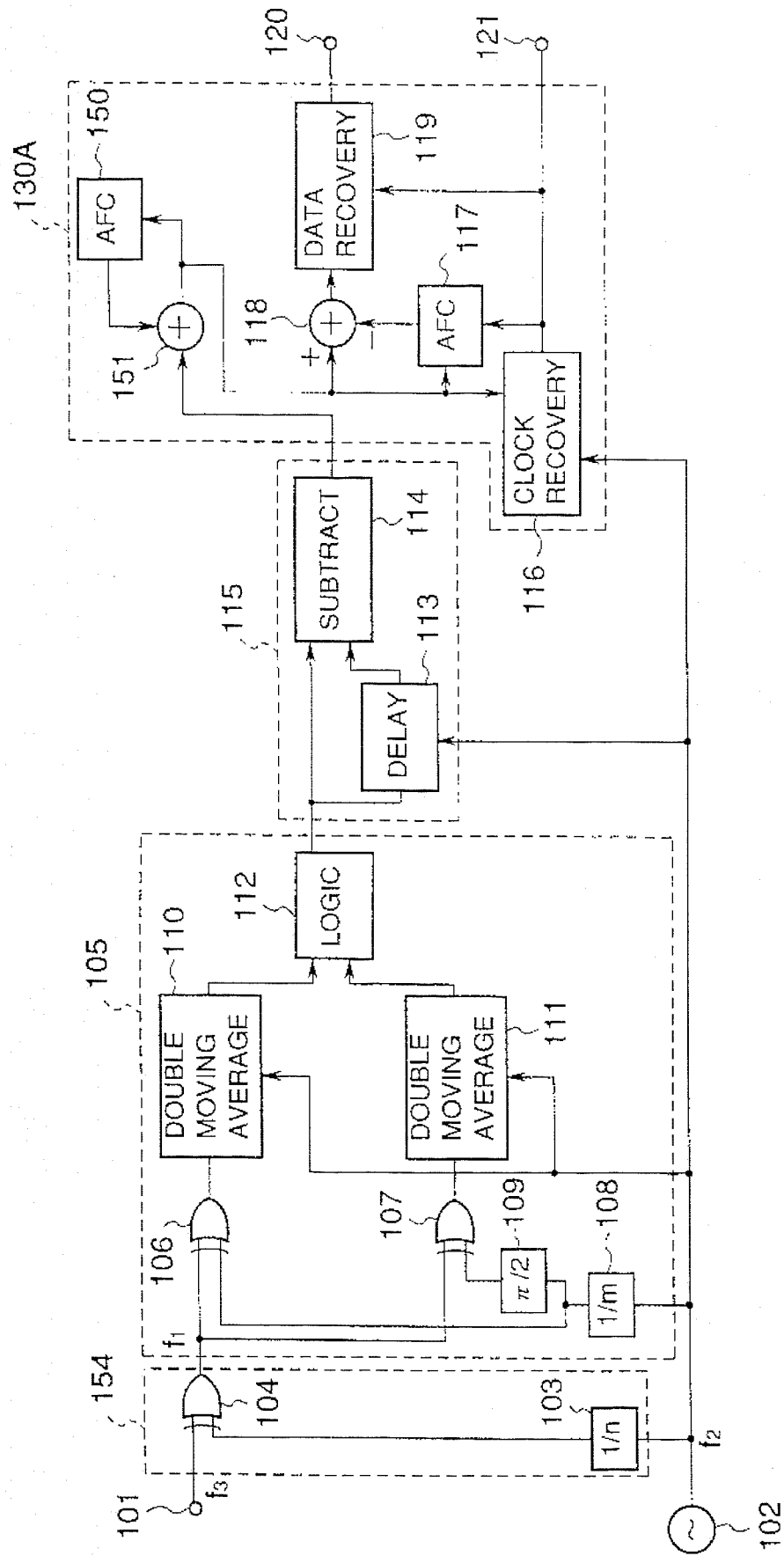
FIG. 20 is a block diagram of a tenth embodiment.

FIG. 20 shows the structure of a tenth embodiment. The tenth embodiment combines the features of the second and third embodiments, using the baseband processing circuit 130A of the second embodiment in place of the baseband processing circuit 130 of the third embodiment in FIG. 11.

Eleventh Embodiment

Figure 21:
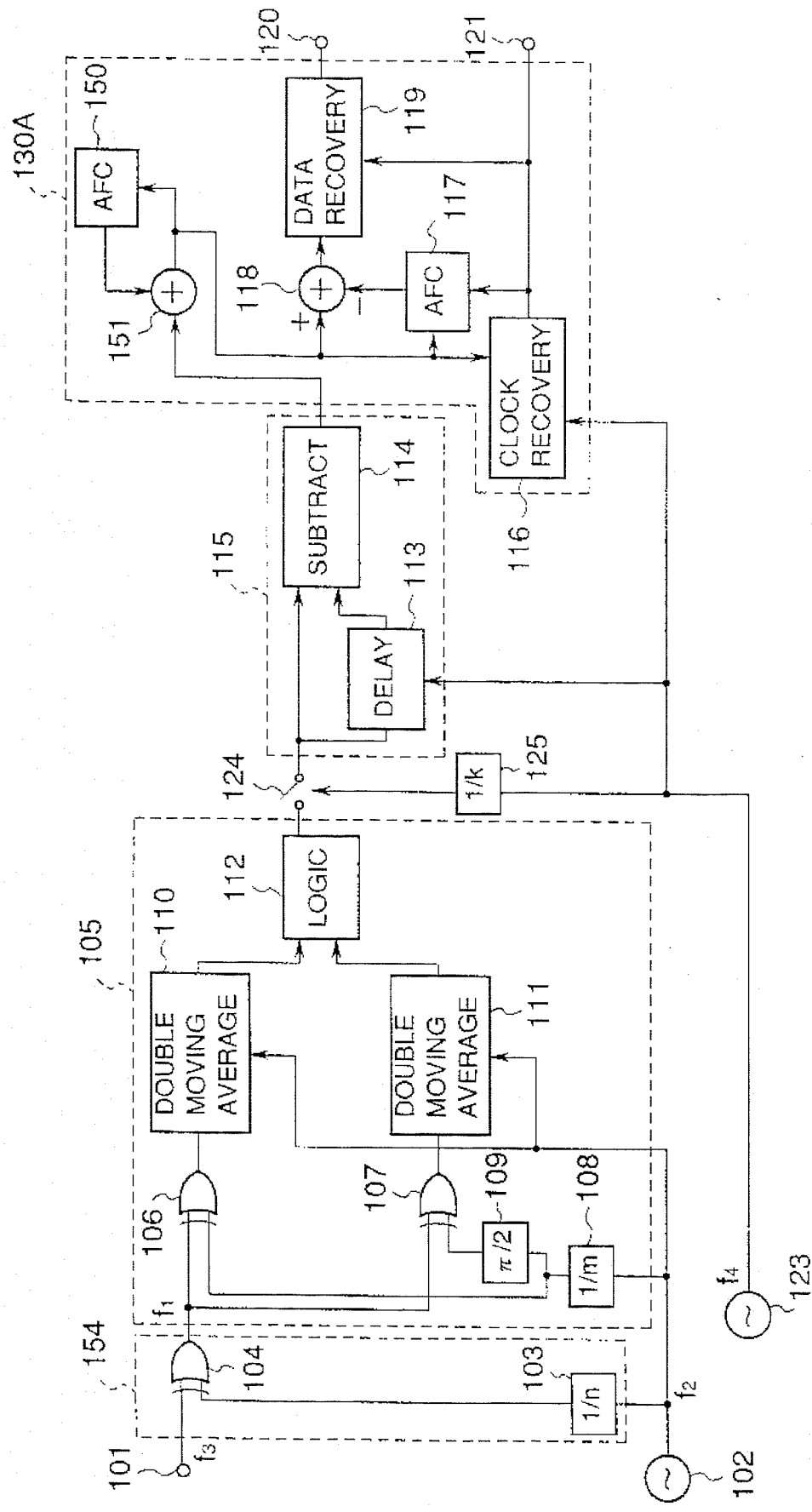
FIG. 21 is a block diagram of an eleventh embodiment.

FIG. 21 shows the structure of an eleventh embodiment. The eleventh embodiment combines the features of the second and fourth embodiments, using the baseband processing circuit 130A of the second embodiment in place of the baseband processing circuit 130 of the fourth embodiment in FIG. 12.

Twelfth Embodiment

Figure 22:
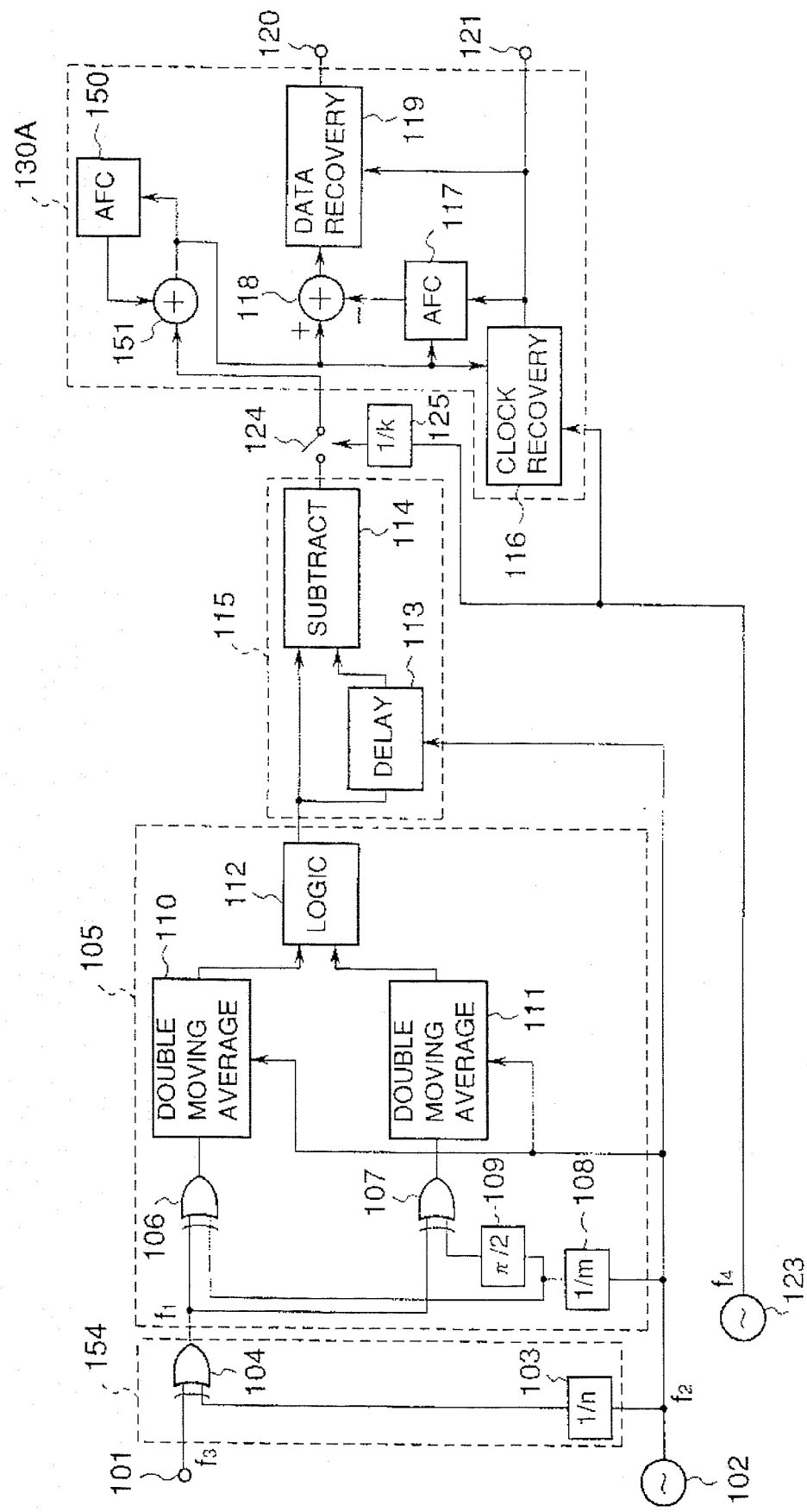
FIG. 22 is a block diagram of a twelfth embodiment.

FIG. 22 shows the structure of a twelfth embodiment. The twelfth embodiment combines the features of the second and fifth embodiments, using the baseband processing circuit 130A of the second embodiment in place of the baseband processing circuit 130 of the fifth embodiment in FIG. 13.

Thirteenth Embodiment

Figure 23:
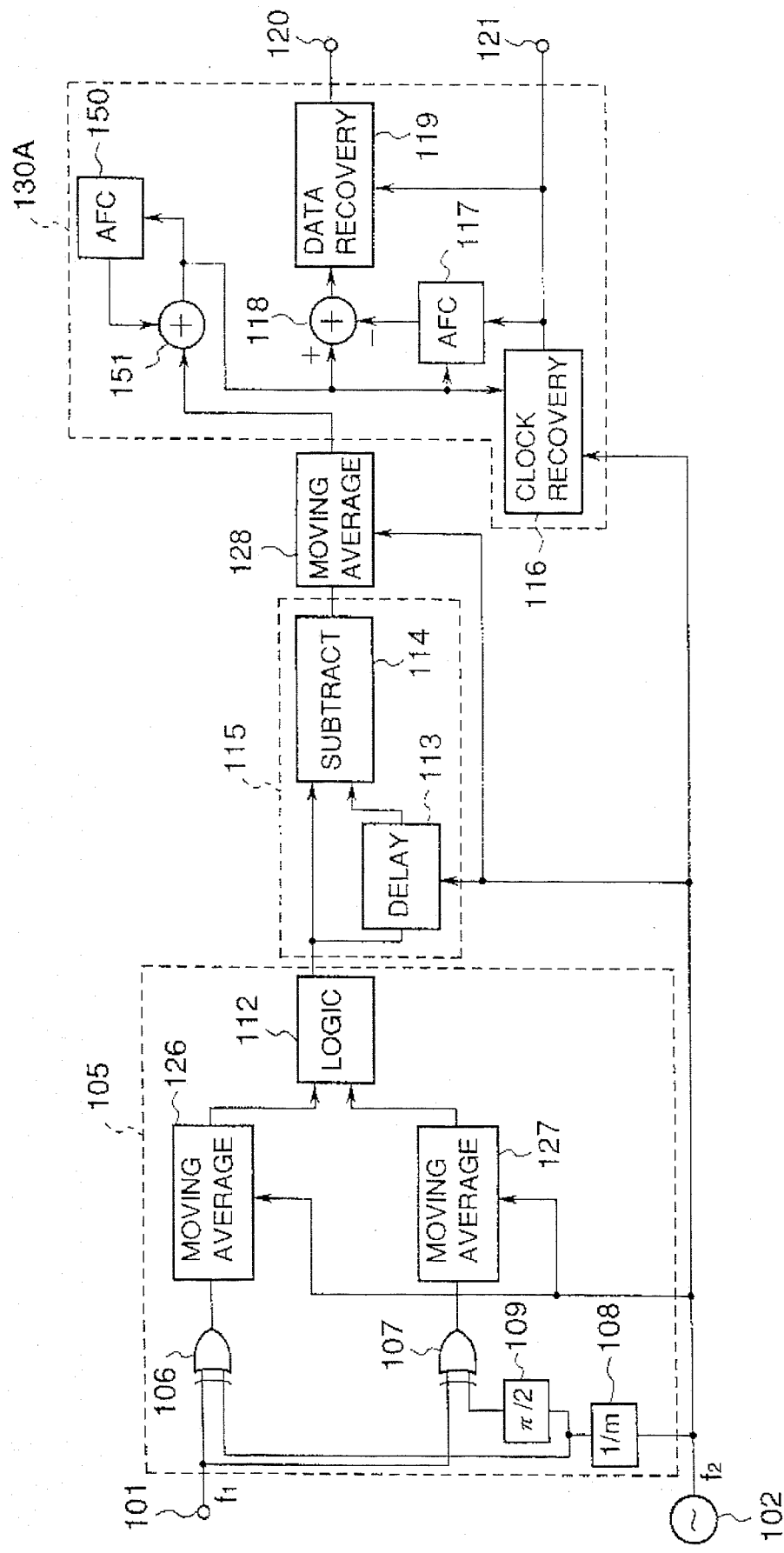
FIG. 23 is a block diagram of a thirteenth embodiment.

FIG. 23 shows the structure of a thirteenth embodiment. The thirteenth embodiment combines the features of the second and sixth embodiments, using the baseband processing circuit 130A of the second embodiment in place of the baseband processing circuit 130 of the sixth embodiment in FIG. 14.

Fourteenth Embodiment

Figure 24:
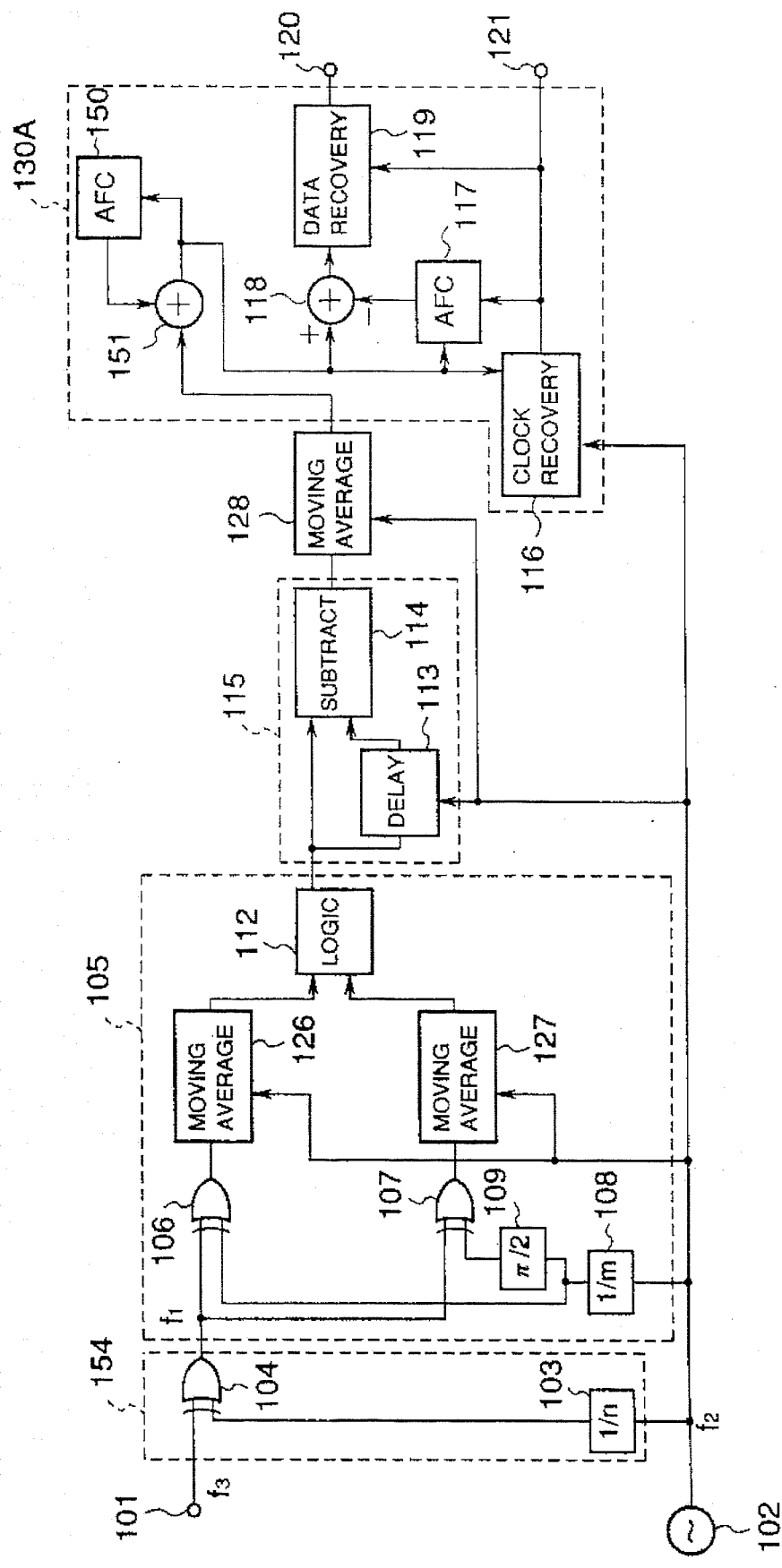
FIG. 24 is a block diagram of a fourteenth embodiment.

FIG. 24 shows the structure of a fourteenth embodiment. The fourteenth embodiment combines the features of the second and seventh embodiments, using the baseband processing circuit 130A of the second embodiment in place of the baseband processing circuit 130 of the seventh embodiment in FIG. 17.

Fifteenth Embodiment

Figure 25:
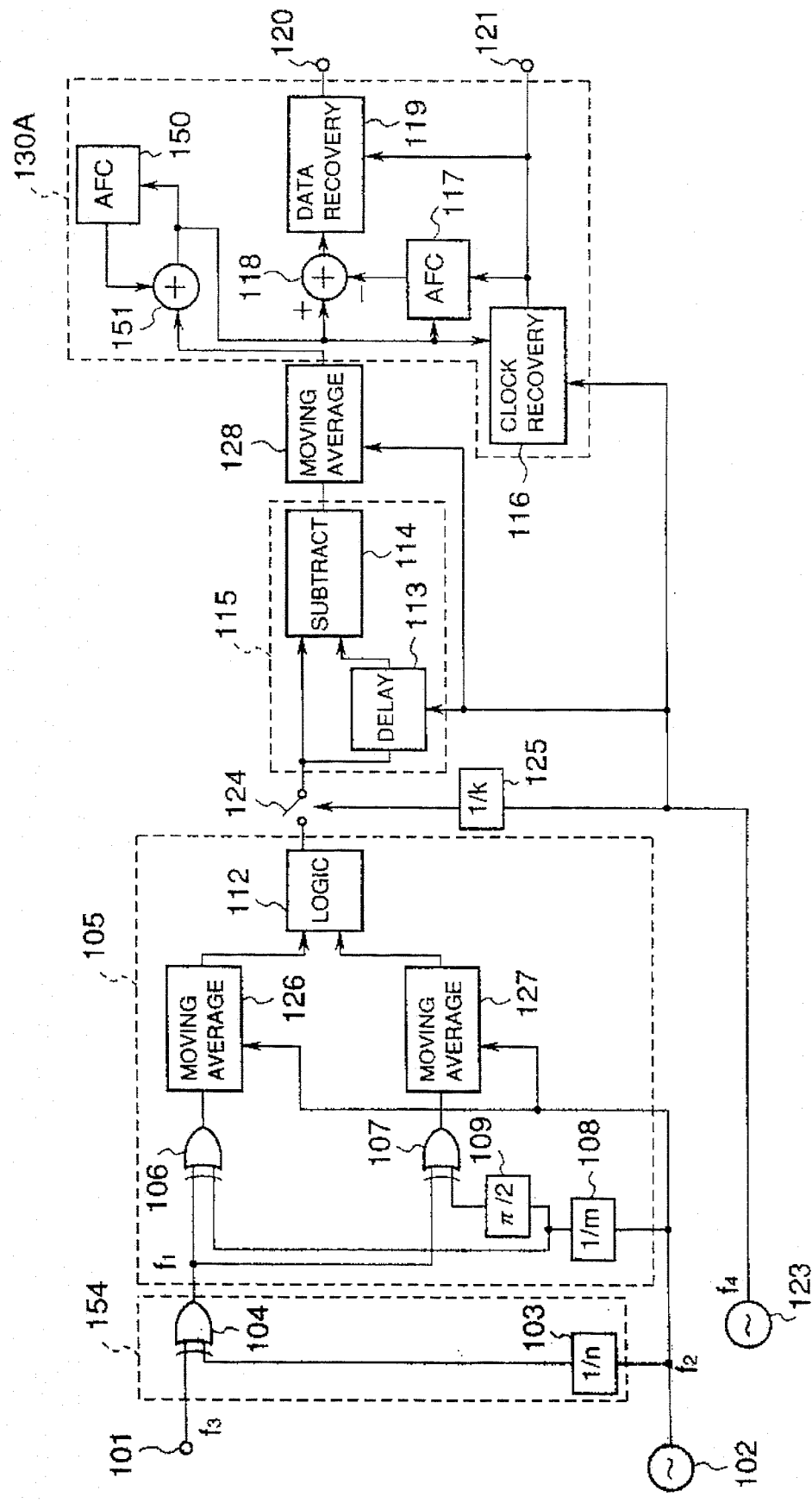
FIG. 25 is a block diagram of a fifteenth embodiment.

FIG. 25 shows the structure of a fifteenth embodiment. The fifteenth embodiment combines the features of the second and eighth embodiments, using the baseband processing circuit 130A of the second embodiment in place of the baseband processing circuit 130 of the eighth embodiment in FIG. 18.

Sixteenth Embodiment

Figure 26:
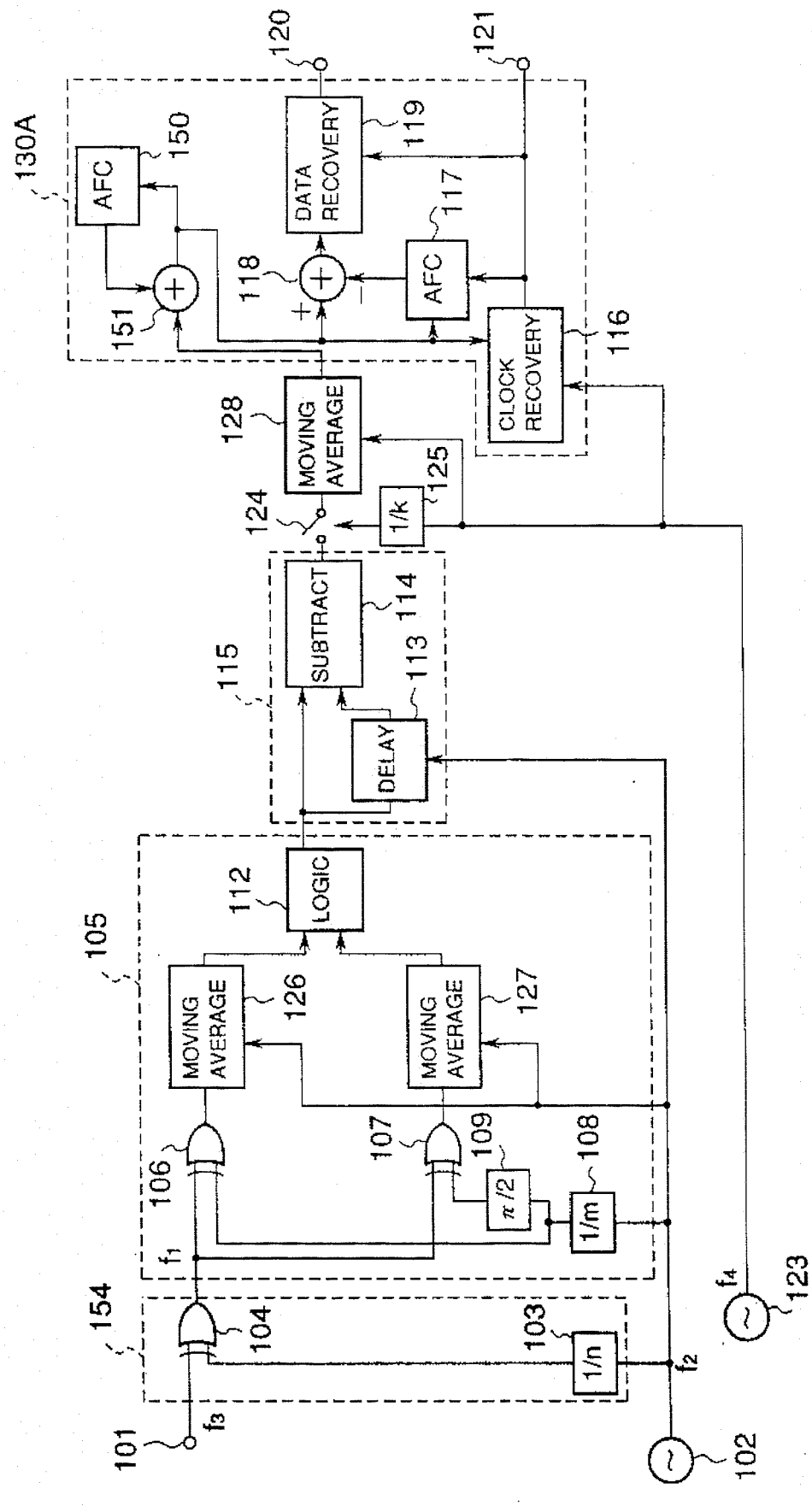
FIG. 26 is a block diagram of a sixteenth embodiment.

FIG. 26 shows the structure of a sixteenth embodiment. The sixteenth embodiment combines the features of the second and ninth embodiments, using the baseband processing circuit 130A of the second embodiment in place of the baseband processing circuit 130 of the ninth embodiment in FIG. 19.

The present invention is not restricted to the preceding sixteen embodiments, but includes as well various modifications of these embodiments. The following are a few examples of possible modifications.

In communication systems designed so that there is substantially no frequency offset between transmitters and receivers, the AFC circuits 117 and 150, subtractor 118, and adder 151 can be omitted.

To provide a $\pi/2$ phase difference in the signals from the two moving-average filters 110 and 111, or 126 and 127, it suffices for there to be a $\pi/2$ phase difference between the first and second clock signals input to the exclusive-OR gates 106 and 107, so a $\pi/2$ phase shifter that advances the phase can be used instead of the $\pi/2$ phase shifter 109 that delays the phase, or a $\pi/2$ phase difference can be created by two $\pi/4$ phase shifters that shift phase in opposite directions.

Logic circuit 112 only needs to be able to create a signal having a phase characteristic that varies linearly in a $2\pi$ range such as $-\pi$ to $\pi$, $\pi$ to $3\pi$, $3\pi$ to $5\pi$, . . . from two moving-average signals differing by $\pi/2$. This can be done in various ways other than the way illustrated in FIG. 2. For example, the polarity of the output of double-moving-average filter 110 could be reversed when the output of double-moving-average filter 111 exceeds $P^2/2$, and left unreversed when the output of double-moving-average filter 111 is less than $P^2/2$. Instead of being reversed in polarity, the output of double-moving-average filter 110 could be subtracted from $2P^2$ to produce an instantaneous phase signal that varies between zero and $2P^2$ instead of between $-P^2$ and $P^2$.

The structures of the moving-average filters are not restricted to the structures shown in the drawings. For example, further logic circuits could be added to these structures to ensure that the values in the up-down counters and output registers stay within the correct ranges (e.g. zero to P for up-down counters 205-1 and 205-2 in FIG. 3 and up-down counter 405 in FIG. 15, and zero to $P^2$ for output register 212 in FIG. 3) despite possibly incorrect inputs to these counters and registers due to noise.

Exclusive-NOR gates can be used instead of exclusive-OR gates 104, 106, and 107.

Exclusive-OR gate 107, moving-average filter 111 or 127, and logic circuit 112 constitute a polarity control circuit for attaching a positive or negative sign to the output of moving-average filter 110 or 126. Although this polarity control structure is preferred, any structure that detects whether the FSK signal leads or lags the first clock signal can be used. For example, the polarity control circuit could be structured to detect whether the rise or fall of the FSK signal occurs within a certain time after the rise or fall of the first clock signal.

Those skilled in the art will recognize that still further modifications are possible without departing from the scope claimed below.

What is claimed is:

1. A frequency-shift-keying detector for demodulating an FSK signal having a certain center frequency and a certain baseband data rate, comprising:

an instantaneous phase detection circuit for receiving said FSK signal and a first master clock signal having a first master frequency, and generating therefrom an instantaneous phase signal representing an instantaneous phase of said FSK signal;

a differentiating circuit coupled to said instantaneous phase detection circuit, for differentiating said instantaneous phase signal and thereby generating an instantaneous frequency signal; and a baseband processing circuit for recovering data and a data clock signal from said instantaneous frequency signal; wherein said instantaneous phase signal and said instantaneous frequency signal are digital signals that represent said instantaneous phase and said instantaneous frequency as digital data.

2. The detector of claim 1, wherein said instantaneous phase detection circuit comprises:

an orthogonal clock generator for receiving said first master clock signal and generating a first clock signal and a second clock signal having equal frequency and differing in phase by π/2 radians;

a first logic circuit for performing a logic operation on said FSK signal and said first clock signal and thereby generating a first phase-difference-responsive signal;

a second logic circuit for performing a logic operation on said FSK signal and said second clock signal and thereby generating a second phase-difference-responsive signal;

a first moving-average filter for taking a moving average of said first phase-difference-responsive signal, thereby creating a first moving-average signal;

a second moving-average filter for taking a moving average of said second phase-difference-responsive signal, thereby creating a second moving-average signal; and a third logic circuit for generating said instantaneous phase signal from said first moving-average signal and said second moving-average signal.

3. The detector of claim 2, wherein said orthogonal clock generator comprises:

a first frequency divider for receiving said first master clock signal and dividing said first master frequency to generate a first divided clock signal; and at least one phase shifter coupled to said first frequency divider, for phase-shifting said first divided clock signal.

4. The detector of claim 2, wherein said first logic circuit and said second logic circuit are exclusive-OR gates.

5. The detector of claim 2, wherein said first logic circuit and said second logic circuit are exclusive-NOR gates.

6. The detector of claim 2, wherein said first moving-average filter and said second moving-average filter are double-moving-average filters that take moving averages of moving averages.

7. The detector of claim 2, wherein said third logic circuit modifies a sign of said first moving-average signal according to a magnitude of said second moving-average signal.

8. The detector of claim 1, further comprising a frequency converter for reducing the center frequency of said FSK signal before input of said FSK signal to said instantaneous phase detection circuit.

9. The detector of claim 8, wherein said frequency converter comprises:

a second frequency divider for receiving said first master clock signal and dividing said first master frequency to generate a second divided clock signal; and a fourth logic circuit for performing a logic operation on said FSK signal and said second divided clock signal.

10. The detector of claim 9, wherein said fourth logic circuit is an exclusive-OR gate.

11. The detector of claim 9, wherein said fourth logic circuit is an exclusive-NOR gate.

12. The detector of claim 1, wherein said baseband processing circuit comprises:

a clock recovery circuit for recovering said data clock from said instantaneous frequency signal;

a frequency offset compensation circuit coupled to said clock recovery circuit, for adjusting said instantaneous frequency signal to compensate for offset between said center frequency and the frequency of said first clock signal, at timings given by said data clock; and a data recovery circuit coupled to said frequency offset compensation circuit, for recovering said data from said instantaneous frequency signal after adjustment by said frequency offset compensation circuit, at timings given by said data clock.

13. The detector of claim 12, wherein said frequency offset compensation circuit is a feedforward circuit.

14. The detector of claim 1, wherein said baseband processing circuit comprises:

a first frequency offset compensation circuit for adjusting said instantaneous frequency signal to bring said instantaneous frequency signal within certain bounds, thereby partially compensating for offset between said center frequency and the frequency of said first clock signal;

a clock recovery circuit coupled to said first frequency offset compensation circuit, for recovering said data clock from the instantaneous frequency signal after adjustment by said first frequency offset compensation circuit;

a second frequency offset compensation circuit coupled to said clock recovery circuit, for adjusting said instantaneous frequency signal after adjustment by said first frequency offset compensation circuit, to compensate for remaining offset between said center frequency and the frequency of said first clock signal, at timings given by said data clock; and a data recovery circuit coupled to said second frequency offset compensation circuit, for recovering said data from said instantaneous frequency signal after compensation for frequency offset by said second frequency offset compensation circuit, at timings given by said data clock.

15. The detector of claim 14, wherein said first frequency offset compensation circuit is a feedback circuit.

16. The detector of claim 14, wherein said second frequency offset compensation circuit is a feedforward circuit.

17. The detector of claim 1, wherein said instantaneous phase detection circuit, said differentiating circuit, and said baseband processing circuit operate in synchronization with said first master clock signal, and said first master frequency is an integer multiple of said baseband data rate.

18. The detector of claim 1, wherein:

said instantaneous phase detection circuit and said differentiating circuit operate in synchronization with said first master clock signal;

said baseband processing circuit operates in synchronization with a second master clock signal having a second master frequency different from said first master frequency; and said second master frequency is an integer multiple of said baseband data rate.

19. The detector of claim 18, comprising:

a third frequency divider for receiving said second master clock signal and dividing said second master frequency to generate a third divided clock signal; and a sampling circuit disposed between said differentiating circuit and said baseband processing circuit, for sampling said instantaneous frequency signal at a sampling rate determined by said third divided clock signal, and providing said instantaneous frequency signal to said baseband processing circuit at said sampling rate.

20. The detector of claim 1, wherein:

said instantaneous phase detection circuit operates in synchronization with said first master clock signal;

said differentiating circuit and said baseband processing circuit operate in synchronization with a second master clock signal having a second master frequency different from said first master frequency; and said second master frequency is an integer multiple of said baseband data rate.

21. The detector of claim 20, comprising:

a third frequency divider for receiving said second master clock signal and dividing said second master frequency to generate a third divided clock signal; and a sampling circuit disposed between said instantaneous phase detection circuit and said differentiating circuit, for sampling said instantaneous phase signal at a sampling rate determined by said third divided clock signal, and providing said instantaneous phase signal to said differentiating circuit at said sampling rate.

22. The detector of claim 1, comprising a moving-average filter disposed between said differentiating circuit and said baseband processing circuit, for filtering said instantaneous frequency signal.

23. A frequency-shift-keying detector for demodulating an FSK signal having a certain center frequency, comprising:

an instantaneous phase detection circuit for detecting a difference in phase between said FSK signal and a first clock signal having a first clock frequency, and generating as digital data an instantaneous phase signal representing said difference;

a differentiating circuit coupled to said instantaneous phase detection circuit, for delaying said instantaneous phase signal and taking a difference between delayed and undelayed versions of said instantaneous, phase signal, thus generating an instantaneous frequency signal; and a baseband processing circuit coupled to said differentiating circuit, for adjusting said instantaneous frequency signal to compensate for offset between said center frequency and said first clock frequency, and recovering data and a data clock signal from the instantaneous frequency signal thus adjusted.

24. The detector of claim 23, wherein said instantaneous phase detection circuit comprises:

a first logic gate for comparing logic levels of said FSK signal and said first clock signal and generating a stream of bits indicating whether said logic levels mutually agree;

a first digital low-pass filter for filtering said stream of bits to generate an absolute phase-difference signal; and a polarity control circuit for determining whether said FSK signal leads or lags said first clock signal and attaching a positive or negative sign to said absolute phase-difference signal accordingly, thereby generating said instantaneous phase signal.

25. The detector of claim 24, wherein said first digital low-pass filter takes a moving average of said stream of bits.

26. The detector of claim 24, wherein said first digital low-pass filter takes an iterated moving average of said stream of bits.

27. The detector of claim 24, wherein said polarity control circuit determines whether said FSK signal leads or lags said first clock signal by comparing logic levels of said FSK signal and a second clock signal orthogonal to said first clock signal.

28. The detector of claim 23, comprising a second digital low-pass filter coupled in series between said differentiating circuit and said baseband processing circuit, for filtering said instantaneous frequency signal.

29. The detector of claim 28, wherein said second digital low-pass filter takes a moving average of said instantaneous frequency signal.

30. The detector of claim 23, comprising a frequency converter for down-converting said FSK signal, thereby reducing said center frequency, before input of said FSK signal to said instantaneous phase detection circuit.

31. The detector of claim 30, wherein said frequency converter comprises a second logic gate for comparing logic levels of said FSK signal and a second clock signal.

32. The detector of claim 30, comprising a sampling circuit coupled in series between said instantaneous phase detection circuit and said differentiating circuit, for sampling said instantaneous phase signal at a rate determined by a third clock signal synchronized to operation of said baseband processing circuit, so that said frequency converter need not be synchronized to operation of said baseband processing circuit.

33. The detector of claim 30, comprising a sampling circuit coupled in series between said differentiating circuit and said baseband processing circuit, for sampling said instantaneous frequency signal at a rate determined by a third clock signal synchronized to operation of said baseband processing circuit 130, so that said frequency converter need not be synchronized to operation of said baseband processing circuit 130.

34. The detector of claim 23, wherein said baseband processing circuit has a feedforward circuit for finding a minimum difference between said instantaneous frequency signal and a set of correct values, and subtracting said minimum difference from said instantaneous frequency signal.

35. The detector of claim 34, wherein said baseband processing circuit also has a feedback circuit for adjusting said instantaneous frequency signal by adding a feedback signal thereto, providing a resulting sum to said feedforward circuit for use therein as said instantaneous frequency signal, comparing said sum with a pair of bounds, and modifying said feedback signal if said sum is not between said bounds.

36. A method of demodulating an FSK signal having a certain center frequency and a certain baseband data rate, comprising the steps of:

detecting an instantaneous phase of said FSK signal;

differentiating said instantaneous phase, thereby obtaining an instantaneous frequency of said FSK signal; and recovering data and a data clock from said instantaneous frequency; wherein said instantaneous phase and said instantaneous frequency are obtained as digital signals.

37. The method of claim 36, wherein said step of detecting comprises:

generating a first clock signal having a certain first clock frequency;

performing a first logic operation on said FSK signal and said first clock signal to generate a first bit stream;

filtering said first bit stream by a first digital low-pass filter to generate a first phase-difference signal;

determining whether said FSK signal leads or lags said first clock signal; and modifying said first phase-difference signal according to whether said FSK signal leads or lags said first clock signal.

38. The method of claim 37, wherein said first logic operation is an exclusive-OR operation.

39. The method of claim 37, wherein said first logic operation is an exclusive-NOR operation.

40. The method of claim 37, wherein said first digital low-pass filter is a moving-average filter.

41. The method of claim 37, wherein said first digital low-pass filter is a double-moving-average filter.

42. The method of claim 37, wherein said step of determining whether said FSK signal leads or lags said first clock signal comprises:

generating a second clock signal orthogonal to said first clock signal;

performing a second logic operation on said FSK signal and said second clock signal to generate a second bit stream;

filtering said second bit stream with a digital low-pass filter to generate a second phase-difference signal; and comparing a magnitude of said second phase-difference signal with a fixed value.

43. The method of claim 37, wherein modifying said first phase-difference signal comprises attaching a positive or negative sign to said first phase-difference signal.

44. The method of claim 36, comprising the further step of reducing said center frequency by mixing said FSK signal with a third clock signal before detecting said instantaneous phase of said FSK signal.

45. The method of claim 44, wherein the step of reducing said center frequency comprises performing a third logic operation on said FSK signal and said third clock signal.

46. The method of claim 45, wherein said third logic operation is an exclusive-OR operation.

47. The method of claim 45, wherein said third logic operation is an exclusive-NOR operation.

48. The method of claim 36, comprising the further step of filtering said instantaneous frequency signal with a third digital low-pass filter before said step of recovering.

49. The method of claim 48, wherein said third digital low-pass filter is a moving-average filter.

50. The method of claim 37, comprising the further step of adjusting said instantaneous frequency to compensate for frequency offset between said center frequency and said first clock frequency.

51. The method of claim 50, wherein said further step of adjusting said instantaneous frequency comprises:

comparing said instantaneous frequency with a set of correct frequencies representing encoded data;

selecting a minimum difference between said instantaneous frequency and said correct frequencies; and subtracting said minimum difference from said instantaneous frequency.

52. The method of claim 51, wherein said further step of adjusting said instantaneous frequency also comprises:

modifying said instantaneous frequency by adding a count value;

comparing the instantaneous frequency as thus modified with an upper bound and a lower bound;

incrementing said count value if the instantaneous frequency thus modified is less than said lower bound; and decrementing said count value if the instantaneous frequency thus modified is greater than said upper bound.

53. The method of claim 36, wherein said steps of detecting, differentiating, and recovering are synchronized with a master clock signal having a frequency equal to an integer multiple of said baseband data rate.

54. The method of claim 36, wherein said steps of detecting and differentiating are synchronized with a first master clock signal having a first master frequency, and said step of recovering is synchronized with a second master clock signal having a second master frequency different from said first master frequency, said second master frequency being an integer multiple of said baseband data rate.

55. The method of claim 36, wherein said step of detecting is synchronized with a first master clock signal having a first master frequency, and said steps of differentiating and recovering are synchronized with a second master clock signal having a second master frequency different from said first master frequency, said second master frequency being an integer multiple of said baseband data rate.

* * * * *